(12) United States Patent
Zhou et al.

(10) Patent No.: US 12,706,470 B2
(45) Date of Patent: Aug. 11, 2026

(54) CHARGING CIRCUIT AND TERMINAL DEVICE

(71) Applicant: Honor Device Co., Ltd., Shenzhen (CN)

(72) Inventors: Haibin Zhou, Shenzhen (CN); Lei Cao, Shenzhen (CN); Yupeng Qiu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 1027 days.

(21) Appl. No.: 17/800,103

(22) PCT Filed: Mar. 9, 2022

(86) PCT No.: PCT/CN2022/079876
§ 371 (c)(1),
(2) Date: Aug. 16, 2022

(87) PCT Pub. No.: WO2022/262328
PCT Pub. Date: Dec. 22, 2022

(65) Prior Publication Data

US 2024/0297521 A1 Sep. 5, 2024

(30) Foreign Application Priority Data

Jun. 15, 2021 (CN) ......................... 202110662327.5

(51) Int. Cl.
*H02J 7/90* (2026.01)
*H02J 7/60* (2026.01)

(52) U.S. Cl.
CPC . *H02J 7/90* (2026.01); *H02J 7/60* (2026.01)

(58) Field of Classification Search
CPC ................................ H02J 7/007; H02J 7/0029
See application file for complete search history.

(56) References Cited

U.S. PATENT DOCUMENTS 9,673,699 B1 6/2017 Viviani et al.
2019/0067960 A1* 2/2019 Sun ....................... H02J 7/0013
(Continued)

FOREIGN PATENT DOCUMENTS

CN 106169798 A 11/2016
CN 108173305 A 6/2018
(Continued)

OTHER PUBLICATIONS

Yibo Xin, "New Power Conversion and Control," Xi'an University of Electronic Science and Technology Press, pp. 85-87 (Jan. 2014).

*Primary Examiner* — Robert Grant
(74) *Attorney, Agent, or Firm* — Leydig, Voit & Mayer, Ltd.

(57) ABSTRACT

Embodiments of this application provide a charging circuit and a terminal device, applied to the technical field of terminals. The charging circuit includes a charging interface, a charging management module, and a cell, where the charging management module is connected to the charging interface and is configured to step down a charging voltage inputted from the charging interface to obtain an output voltage, and increase a charging current inputted from the charging interface to obtain a total output current, where the output voltage is 1/N times the charging voltage, the total output current is N times the charging current, and N is a positive integer greater than 2; and the charging management module is further connected to the cell and is configured to input the output voltage and the total output current to the cell to charge the cell.

20 Claims, 20 Drawing Sheets

(56) References Cited

U.S. PATENT DOCUMENTS

| | | | | |
|---|---|---|---|---|
| 2020/0099232 | A1* | 3/2020 | Parmar | H01M 10/425 |
| 2020/0403434 | A1 | 12/2020 | Jin et al. | |

FOREIGN PATENT DOCUMENTS

| | | | |
|---|---|---|---|
| CN | 109301903 | A | 2/2019 |
| CN | 209709071 | U | 11/2019 |
| CN | 112737319 | A | 4/2021 |
| CN | 112909344 | A | 6/2021 |
| CN | 113595168 | A | 11/2021 |

* cited by examiner

CHARGING CIRCUIT AND TERMINAL DEVICE

CROSS-REFERENCE TO RELATED APPLICATIONS

This application is a National Stage of International Application No. PCT/CN2022/079876, filed on Mar. 9, 2022, which claims priority to Chinese Patent Application No. 202110662327.5, filed on Jun. 15, 2021, both of which are hereby incorporated by reference in their entireties.

TECHNICAL FIELD

This application relates to the technical field of terminals, and in particular, to a charging circuit and a terminal device.

BACKGROUND

With rapid development of terminal devices, terminal devices are having increasingly high performance, and their consumption of battery power also becomes significantly faster, leading to an increasingly strong demand for fast charging.

In the related art, charging power of a terminal device can only reach a maximum of 50 W (under a charging voltage of 10 V and a charging current of 5 A). Such charging power is quite low.

SUMMARY

Embodiments of this application provide a charging circuit and a terminal device. The charging circuit is applied to the terminal device, which can help increase charging power of the terminal device.

According to a first aspect, an embodiment of this application provides a charging circuit, including a charging interface, a charging management module, and a cell, where the charging management module is connected to the charging interface and is configured to step down a charging voltage inputted from the charging interface to obtain an output voltage, and increase a charging current inputted from the charging interface to obtain a total output current, where the output voltage is 1/N times the charging voltage, the total output current is N times the charging current, and N is a positive integer greater than 2; and the charging management module is further connected to the cell and is configured to input the output voltage and the total output current to the cell to charge the cell, where a product of a maximum charging voltage and a maximum charging current that are inputted from the charging interface is greater than 50 W.

In this way, in this application, the charging power inputted from the charging interface is increased, so that a product of the maximum charging voltage and the maximum charging current that are inputted from the charging interface is greater than 50 W, that is, maximum charging power can be greater than 50 W, thereby increasing the charging power and shortening charging time. In addition, through a step-down function of the charging management module, the output voltage inputted to the cell can meet a charging requirement of the cell.

Optionally, the cell includes M tab groups, the tab groups each including a positive tab and a negative tab, where M is a positive integer greater than 1; and a specified voltage inputted to each of the tab groups is equal to the output voltage, and a specified current inputted to each of the tab groups is the total output current divided by M.

Optionally, the maximum charging voltage is greater than 10 V, the maximum charging current is 5 A, a maximum specified voltage allowed to be inputted to each of the tab groups is 5 V, and a maximum specified current allowed to be inputted to each of the tab groups is 10 A.

Optionally, the cell includes a cell body and M tab groups, and the tab groups are all located on a same side of the cell body.

Optionally, the cell includes three tabs, the three tabs form two tab groups, and the two tab groups share one positive tab or one negative tab. In this way, two tab groups are formed by sharing the positive tab or the negative tab, which is equivalent to connect the two tab groups in parallel. Therefore, resistance of the tab groups in parallel is reduced, which can further reduce heat generated during cell charging.

Optionally, the cell includes a cell body and M tab groups, some of the M tab groups are located on a first side of the cell body, the rest of the M tab groups are located on a second side of the cell body, and the first side and the second side are opposite sides of the cell body; and the first side and the second side of the cell body both include at least one tab group.

Optionally, the first side and the second side of the cell body both include one tab group.

Optionally, the first side and the second side of the cell body both include two tab groups, with two tab groups located on the first side sharing one positive tab or one negative tab and two tab groups located on the second side sharing one positive tab or one negative tab.

Optionally, the charging management module includes a first charging management chip, and the first charging management chip is connected to all the tab groups located on the same side of the cell body; and the output voltage resulting from stepping down the charging voltage by the first charging management chip is 1/N times the charging voltage.

Optionally, a quantity of first charging management chips in the charging management module is equal to a quantity of sides on which the tab groups of the cell are distributed.

Optionally, the first charging management chip includes a first control circuit, a second control circuit, and N first storage circuits; the first control circuit is connected to a first control signal end and the N first storage circuits and is configured to be closed under an action of a first control signal inputted from the first control signal end to connect the N first storage circuits in series; and the second control circuit is connected to a second control signal end and the N first storage circuits and is configured to be closed under an action of a second control signal inputted from the second control signal end to connect the N first storage circuits in parallel; where the first control signal and the second control signal are phase inversion signals.

Optionally, the first control circuit includes N first switch components, and all the first switch components except the $1^{st}$ first switch component are connected between two adjacent first storage circuits, where an input terminal of the $1^{st}$ first switch component is connected to the charging interface and an output terminal of the $1^{st}$ first switch component is connected to a first terminal of the $1^{st}$ first storage circuit; the second control circuit includes N−1 switch units, and the switch units each include two second switch components, where an input terminal of the $1^{st}$ second switch component is connected to a first terminal of the first storage circuit, an output terminal of the $1^{st}$ second switch component is connected to an output terminal of the first charging management chip, an input terminal of the $2^{nd}$ second switch component is connected to a second terminal of the first storage circuit, and an output terminal of the $2^{nd}$ second switch component is connected to a ground terminal; and a first terminal of the last first storage circuit is connected to the output terminal of the first charging management chip, and a second terminal of the last first storage circuit is connected to the ground terminal: where the first storage circuits each include a first storage capacitor, and the first switch component and the second switch component are switch transistors with a body diode.

Optionally, the charging management module includes one or two charging management units connected in parallel, the charging management units each include two second charging management chips connected in series, and the two second charging management chips connected in series are respectively a first management chip and a second management chip, where N equals 4; an input terminal of the first management chip is connected to the charging interface, an output terminal of the first management chip is connected to an input terminal of the second management chip, and an output terminal of the second management chip is connected to the tab groups located on the same side of the cell body; and a transition voltage resulting from stepping down the charging voltage by the first management chip is ½ times the charging voltage, and an output voltage resulting from stepping down the transition voltage by the second management chip is ½ times the transition voltage.

Optionally, the charging management module includes one charging management unit, and the output terminal of the second management chip is connected to the two tab groups located on the same side of the cell body.

Optionally, the charging management module includes two charging management units connected in parallel, and an output terminal of each of the second management chips is connected to one of the tab groups.

Optionally, the second charging management chips each include a third control circuit, a fourth control circuit, and two second storage circuits; the third control circuit is connected to a third control signal end and the two second storage circuits and is configured to be closed under an action of a third control signal inputted from the third control signal end to connect the two second storage circuits in series; and the fourth control circuit is connected to a fourth control signal end and the two second storage circuits and is configured to be closed under an action of a fourth control signal inputted from the fourth control signal end to connect the two second storage circuits in parallel; where the third control signal and the fourth control signal are phase inversion signals.

Optionally, the third control circuit includes two third switch components, an input terminal of the $1^{st}$ third switch component is connected to the charging interface, an output terminal of the $1^{st}$ third switch component is connected to a first terminal of the $1^{st}$ second storage circuit, an input terminal of the $2^{nd}$ third switch component is connected to a second terminal of the $1^{st}$ second storage circuit, an output terminal of the $2^{nd}$ third switch component is connected to a first terminal of the $2^{nd}$ second storage circuit and an output terminal of the second charging management chip, and a second terminal of the $2^{nd}$ second storage circuit is connected to the ground terminal; and the fourth control circuit includes two fourth switch components, an input terminal of the 1st fourth switch component is connected to a first terminal of the $1^{st}$ second storage circuit, an output terminal of the 1st fourth switch component is connected to the output terminal of the second charging management chip, an input terminal of the $2^{nd}$ fourth switch component is connected to the second terminal of the $1^{st}$ second storage circuit, and an output terminal of the $2^{nd}$ fourth switch component is connected to the ground terminal; where the second storage circuits each include a second storage capacitor, and the third switch component and the fourth switch component are switch transistors with a body diode.

Optionally, the maximum charging voltage is 20 V, where N equals 4 and M is 2 or 4.

According to a second aspect, an embodiment of this application provides a terminal device, including a main board, a micro board, a connecting circuit board, a battery protection board, and the foregoing charging circuit; where the charging interface is located on the micro board, one end of the connecting circuit board is connected to the micro board, the other end of the connecting circuit board is connected to the main board, at least part of the charging management chips in the charging management module are located on the main board, and the charging management module is connected to the tab groups of the cell via the battery protection board.

It should be understood that, in this application, technical solutions of the second aspect correspond to those of the first aspect, and beneficial effects achieved by all aspects and corresponding feasible implementations are similar. Details are not described herein again.

DESCRIPTION OF EMBODIMENTS

Figure 1:
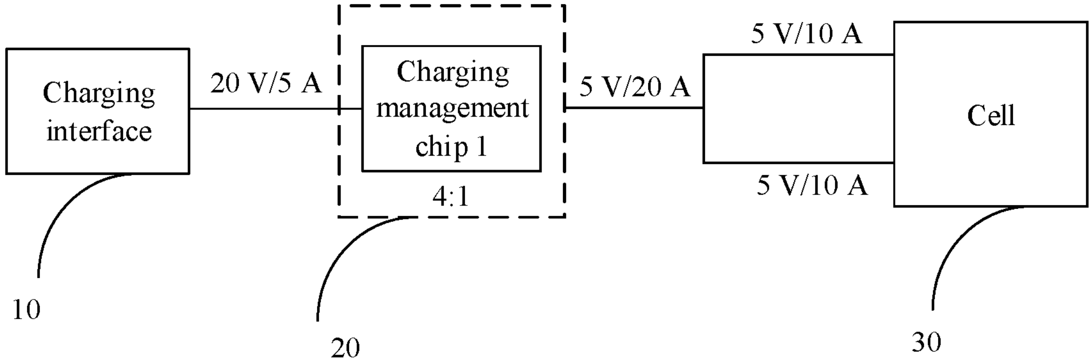
FIG. 1 is a schematic structural diagram of a first charging circuit according to an embodiment of this application.

For ease of clear description of the technical solutions of the embodiments of this application, in the embodiments of this application, the words such as "first" and "second" are used to distinguish the same items or similar items having substantially the same functions or roles. For example, a first chip and a second chip are merely used to distinguish different chips, and a sequence of the first chip and the second chip is not limited. A person skilled in the art may understand that the words such as "first" and "second" do not limit a quantity and an execution sequence, and the words such as "first" and "second" do not indicate a definite difference.

It should be noted that, in the embodiments of this application, the words such as "an example" or "for example" are used to represent an example, an instance, or an illustration. Any embodiment or design solution described as "an example" or "for example" in this application shall not be construed as being more preferential or advantageous than other embodiments or design solutions. To be precise, the words such as "an example" or "for example" are intended to present a related concept in a specific manner.

In the embodiments of this application, "at least one" means one or more, and "a plurality of" means two or more. The term "and/or" describes an association relationship between associated objects, and indicates that three relationships may exist. For example, A and/or B may represent the following cases: only A, both A and B, and only B, where A and B may be singular or plural. The character "/" usually indicates an "or" relationship between associated objects. "At least one of the following items (objects)" or a similar expression means any combination of these items, including a single item (object) or any combination of a plurality of items (objects). For example, at least one of a, b, or c may indicate: a, b, c, a and b, a and c, b and c, or a, b, and c, where a, b, and c may be singular or plural.

A charging circuit provided in the embodiments of this application may be applied to a terminal device with a battery. The battery includes a battery protection board and a cell. The battery protection board is configured to provide protection for the cell during charging or discharging of the cell, such as overvoltage protection, undervoltage protection, short-circuit protection, discharge overcurrent protection, and charge overcurrent protection. The cell is a main component for storing power in and discharging the battery, and the cell includes a positive tab and a negative tab.

To charge the cell, a charging interface and a charging management module need to be disposed in the charging circuit. The charging interface may be a USB interface conforming to universal serial bus (USB) specifications, and may specifically be a mini USB interface, a micro USB interface, a USB type C interface, or the like. The charging management module is configured to receive charge input from a charger, where the charger is a wired charger.

After the wired charger is connected to the charging interface, the charging management module may receive the charge input from the wired charger through the charging interface, that is, receive a charging voltage and a charging current inputted by the charger from the charging interface. The charging management module steps down the charging voltage and increases the charging current inputted from the charging interface, so that an output voltage outputted by the charging management module is 1/N times the charging voltage, and a total output current outputted by the charging management module is N times the charging current. Then, the charging management module inputs the converted output voltage and the total output current to the positive tab of the cell to charge the cell.

In an actual charging process, while charging the cell, the charging management module also supplies power to the terminal device by using a power management module disposed on a main board, for example, supplying power to a processor, an internal memory, a display, a camera, a wireless communication module, and the like by using the power management module. This solution focuses on a process of charging the cell, and a specific process of the charging management module supplying power to the terminal device is not described in detail herein.

In the related art, after a charger is connected to a charging interface, a maximum charging voltage inputted to the charging interface is 10 V, and a maximum charging current inputted is 5 A. A charging management chip reduces the maximum charging voltage of 10 V to 5 V, and increases the maximum charging current of 5 A to 10 A. In this case, maximum charging power can only reach 50 W. Such low charging power results in a longer time for a cell to be fully charged.

It should be noted that the maximum charging voltage is a maximum value of a charging voltage that the terminal device allows the charger to input, and the maximum charging current is a maximum value of a charging current that the terminal device allows the charger to input. In a case that a charging voltage actually inputted by the charger is greater than the maximum charging voltage and/or a charging current actually inputted by the charger is greater than the maximum charging current, the service life of the battery is shortened, or even the battery is burned out.

Based on this, in the embodiments of this application, charging power inputted from the charging interface is increased, so that a product of the maximum charging voltage and the maximum charging current that are inputted from the charging interface is greater than 50 W, that is, maximum charging power can be greater than 50 W, thereby increasing the charging power and shortening charging time. In addition, through a step-down function of the charging management module, the output voltage inputted to the cell can meet a charging requirement of the cell.

FIG. 1, FIG. 11, FIG. 17, and FIG. 23 are schematic structural diagrams of four charging circuits according to embodiments of this application.

The following describes that a charging circuit in the embodiments of this application can increase charging power to be greater than 50 W according to four optional implementations by using an example in which a maximum charging voltage inputted by a charger to a charging interface 10 is 20 V, and a maximum charging current inputted by the charger to the charging interface 10 is 5 A.

Figure 2:
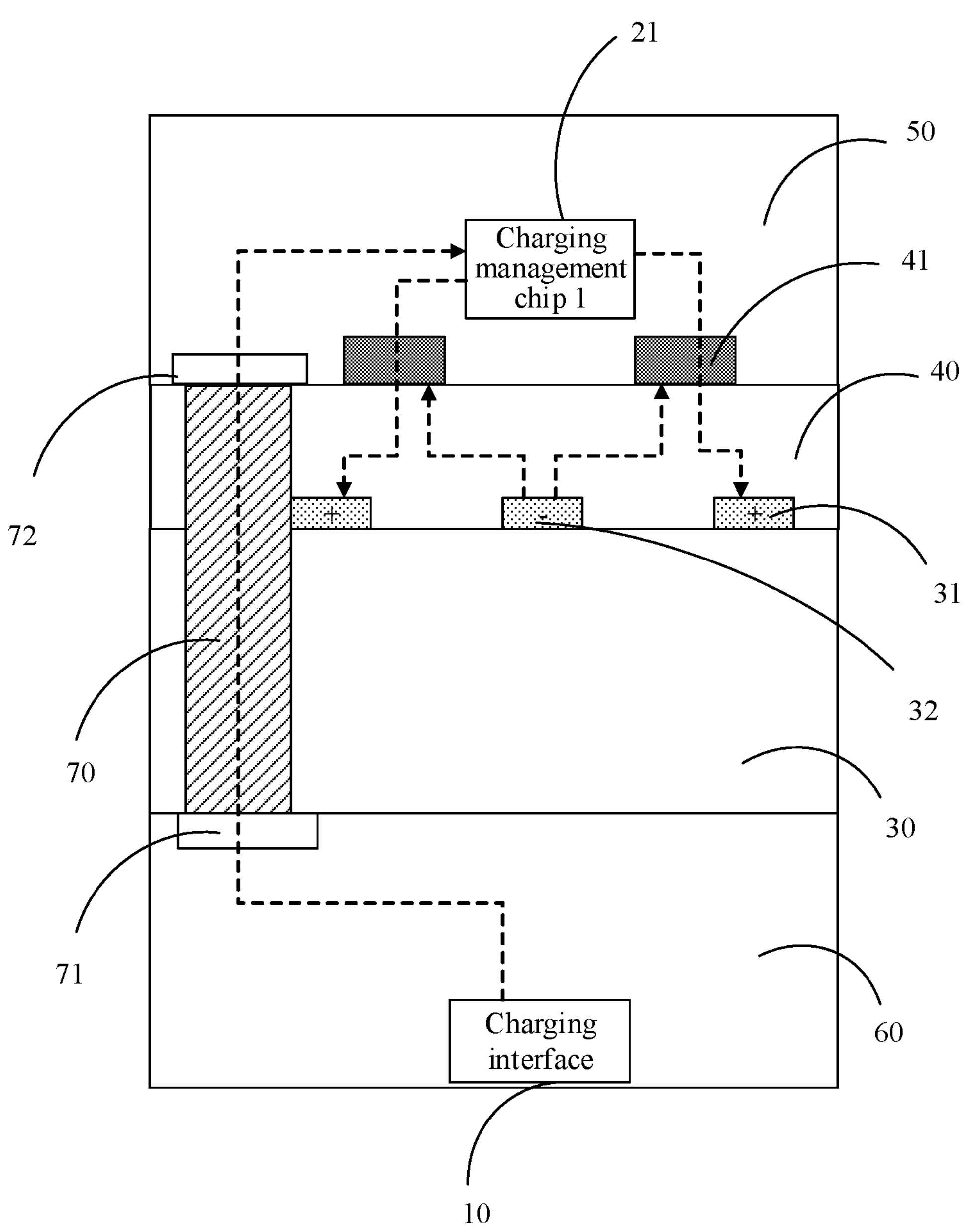
FIG. 2 is an architecture diagram of a terminal corresponding to the charging circuit shown in FIG. 1.

In a first implementation, as shown in FIG. 1 and FIG. 2, the charging circuit includes the charging interface 10, a charging management module 20, and a cell 30. The charging management module 20 includes a first charging management chip 21. For example, the first charging management chip 21 is a charging management chip 1, and the charging management chip 1 is connected to the charging interface 10 and all tab groups located on a same side of a cell body.

In this case, the cell 30 includes the cell body and three tabs, which are respectively two positive tabs 31 and one negative tab 32. The negative tab 32 is located between the two positive tabs 31, and the three tabs form two tab groups. The two tab groups share the negative tab 32, and the two tab groups are located on a same side of the cell body. The cell body is all the structures of the cell 30 except the tabs. For example, the cell body includes a positive electrode plate, a negative electrode plate, and a separator disposed between the positive electrode plate and the negative electrode plate.

It should be understood that the cell 30 may alternatively include the cell body and three tabs, which are respectively two negative tabs 32 and one positive tab 31. The positive tab 31 is located between the two negative tabs 32, and the three tabs form two tab groups. The two tab groups share the positive tab 31.

As shown in FIG. 2, in an actual product, the charging interface 10 is disposed on a micro board 60. The micro board 60 is connected to a connecting circuit board 70 through a first circuit board connecting port 71. The connecting circuit board 70 is connected to the charging management chip 1 disposed on a main board 50 through a second circuit board connecting port 72. The charging management chip 1 is connected to a battery protection board 40 through two protection board interfaces 41. The battery protection board 40 is connected to the two tab groups of the cell 30.

In this case, a step-down ratio of the charging management chip 1 is 4:1, that is, N equals 4. The charging management chip 1 steps down a charging voltage $V_1$ inputted from the charging interface, and an output voltage $V_2$ resulting from the step-down is ¼ times the charging voltage $V_1$. Correspondingly, the charging management chip 1 increases a charging current $A_1$ inputted from the charging interface, and a total output current $A_2$ resulting from the increase is $4\times A_1$.

When a maximum charging voltage is 20 V and a maximum charging current is 5 A, $V_1$ may be 20 V, and $A_1$ may be 5 A. Therefore, after the charger is connected to the charging interface 10, the charger outputs a charging voltage of 20 V and a charging current of 5 A, and then the charging voltage and the charging current sequentially pass through the micro board 60, the first circuit board connecting port 71, the connecting circuit board 70, the second circuit board connecting port 72, and the main board 50, and then enter the charging management chip 1. The charging management chip 1 converts the charging voltage of 20 V at a step-down ratio of 4:1, the converted output voltage $V_2$ is 5 V, and the converted total output current $A_2$ is 20 A. Then, the total output current $A_2$ resulting from the conversion by the charging management chip 1 is divided. One of the currents enters the battery protection board 40 through one of the protection board interfaces 41 (for example, the protection board interface 41 on the left side in FIG. 2), and then flows into the positive tab 31 in one of the tab groups (for example, the tab group formed by the positive tab 31 on the left side in FIG. 2 and the shared negative tab 32). The other current enters the battery protection board 40 through the other protection board interface 41 (for example, the protection board interface 41 on the right side in FIG. 2), and then flows into the positive tab 31 in the other tab group (for example, the tab group formed by the positive tab 31 on the right side in FIG. 2 and the shared negative tab 32). The total output current is divided to flow into the two tab groups, so that a specified voltage and a specified current that flow into each of the tab groups are 5 V and 10 A respectively.

In this case, maximum charging power inputted by the charger to the charging interface 10 is 20 V×5 A=100 W. If conversion efficiency losses of the charging management chip 1 and circuit losses on the charging circuit are ignored, power inputted to the cell 30 through each of the tab groups is a product of the specified voltage and the specified current, that is, 5 V×10 A=50 W, and therefore power inputted through the two tab groups to the cell 30 is 50 W+50 W=100 W.

When the specified currents flowing into the tab groups are reduced, heat generated by the cell 30 decreases. For example, impedance of the cell 30 is 20 mΩ. If the cell 30 is directly charged with a current of 20 A, an amount of heat generated is $P=I_1^2\times R=20\times 20\times 20=8$ W, where $I_1$ is a current that directly flows into a tab group when charging the cell having only the tab group, and R is the impedance of the cell 30. After the current is divided to flow into two tab groups, a specified current flowing into each of the tab groups is 10 A, and the amount of heat generated is $P=2\times 1_2^2\times R=2\times 10\times 10\times 20=4$ W, where $I_2$ is the specified current flowing into each of the tab groups when charging the cell 30 having the two tab groups, and R is the impedance of the cell 30. It can be learned that the amount of heat generated is reduced by half by dividing the current to flow into the two tab groups, which can effectively reduce the heat generated by the cell 30 during charging.

Further, the two tab groups are formed by sharing the positive tab 31 or the negative tab 32, which is equivalent to connect the two tab groups in parallel. Therefore, resistance of the tab groups in parallel is reduced, which can further reduce the heat generated by the cell 30 during charging.

In addition, a quantity of first charging management chips 21 in FIG. 1 is 1, and the two tab groups of the cell 30 are located on a same side, that is, on a side of the cell body farther away from the micro board 60, so that the quantity of first charging management chips 21 in the charging management module 20 is equal to a quantity of sides on which the tab groups of the cell 30 are distributed.

Figure 3:
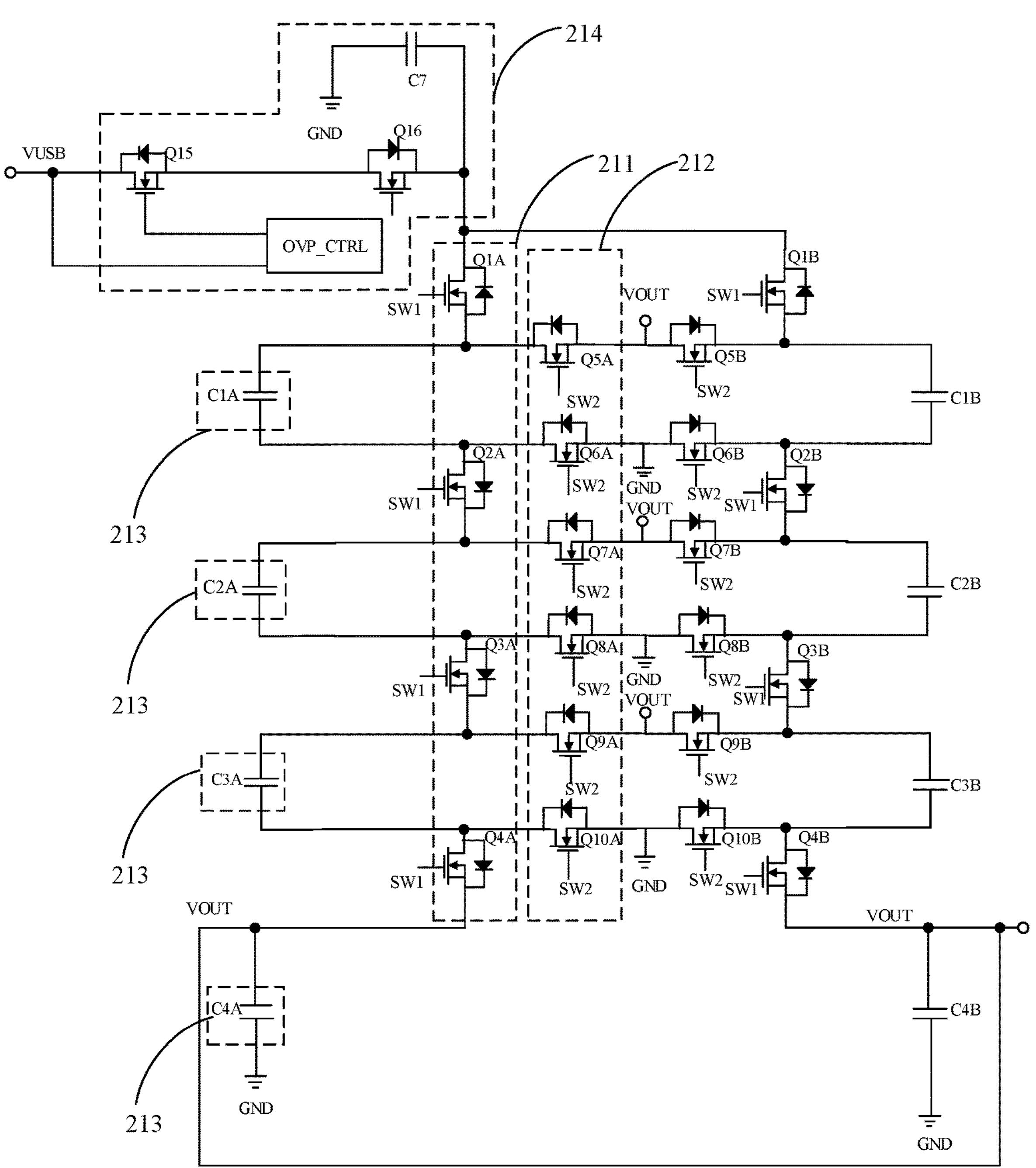
FIG. 3 is a circuit diagram of a first charging management chip.

As shown in FIG. 3, the first charging management chip 21 includes a first control circuit 211, a second control circuit 212, and N first storage circuits 213; the first control circuit 211 is connected to a first control signal end SW1 and the N first storage circuits 213 and is configured to be closed under an action of a first control signal inputted from the first control signal end SW1 to connect the N first storage circuits 213 in series; and the second control circuit 212 is connected to a second control signal end SW2 and the N first storage circuits 213 and is configured to be closed under an action of a second control signal inputted from the second control signal end SW2 to connect the N first storage circuits 213 in parallel; where the first control signal and the second control signal are phase inversion signals.

The first control circuit 211 includes N first switch components (for example Q1A, Q2A, Q3A, and Q4A), and all the first switch components except the $1^{st}$ first switch component Q1A (for example Q2A, Q3A, and Q4A) are connected between two adjacent first storage circuits 213, where an input terminal of the 1$^{st}$ first switch component Q1A is connected to the charging interface 10) and an output terminal of the 1$^{st}$ first switch component Q1A is connected to a first terminal of the 1$^{st}$ first storage circuit 213; the second control circuit 212 includes N−1 switch units, and the switch units each include two second switch components (for example Q5A and Q6A), where an input terminal of the 1$^{st}$ second switch component (for example Q5A) is connected to a first terminal of the first storage circuit 213, an output terminal of the 1$^{st}$ second switch component (for example Q5A) is connected to an output terminal VOUT of the first charging management chip 21, an input terminal of the 2$^{nd}$ second switch component (for example Q6A) is connected to a second terminal of the first storage circuit 213, and an output terminal of the 2$^{nd}$ second switch component (for example Q6A) is connected to a ground terminal GND; and a first terminal of the last first storage circuit 213 (for example C4A) is connected to the output terminal VOUT of the first charging management chip 21, and a second terminal of the last first storage circuit 213 (for example C4A) is connected to the ground terminal GND; where the first storage circuits 213 each include a first storage capacitor, and the first switch component and the second switch component are switch transistors with a body diode.

In a case that a step-down ratio of the first charging management chip 21 is 4:1, that is, N equals 4, a quantity of first storage circuits 213 in the first charging management chip 21 is 4, and the first storage capacitors included in the four first storage circuits 213 are C1A, C2A, C3A, and C4A respectively. A quantity of first switch components included in the first control circuit 211 is also 4, and the four first switch components are Q1A, Q2A, Q3A, and Q4A respectively. A quantity of switch units included in the second control circuit 212 is 3, and the switch units each include two second switch components, that is, Q5A and Q6A form a switch unit, Q7A and Q8A form a switch unit, and Q9A and Q10A form a switch unit.

A control terminal of the 1$^{st}$ first switch component Q1A is connected to the first control signal end SW1, an input terminal of the 1$^{st}$ first switch component Q1A is connected to the charging interface 10, and an output terminal of the 1$^{st}$ first switch component Q1A is connected to a first terminal of the 1$^{st}$ first storage capacitor C1A. A control terminal of the 2nd first switch component Q2A is connected to the first control signal end SW1, an input terminal of the 2$^{nd}$ first switch component Q2A is connected to a second terminal of the 1$^{st}$ first storage capacitor C1A, and an output terminal of the 2$^{nd}$ first switch component Q2A is connected to a first terminal of the 2$^{nd}$ first storage capacitor C2A. A control terminal of the 3$^{rd}$ first switch component Q3A is connected to the first control signal end SW1, an input terminal of the 3$^{rd}$ first switch component Q3A is connected to a second terminal of the 2$^{nd}$ first storage capacitor C2A, and an output terminal of the 3$^{rd}$ first switch component Q3A is connected to a first terminal of the 3$^{rd}$ first storage capacitor C3A. A control terminal of the 4th first switch component Q4A is connected to the first control signal end SW1, an input terminal of the 4th first switch component Q4A is connected to a second terminal of the 3$^{rd}$ first storage capacitor C3A, and an output terminal of the 4th first switch component Q4A is connected to a first terminal of the 4th first storage capacitor C4A and the output terminal VOUT of the first charging management chip 21.

In the 1$^{st}$ switch unit, a control terminal of the 1$^{st}$ second switch component Q5A is connected to the second control signal end SW2, an input terminal of the 1$^{st}$ second switch component Q5A is connected to the first terminal of the 1$^{st}$ first storage capacitor C1A, an output terminal of the 1$^{st}$ second switch component Q5A is connected to the output terminal VOUT of the first charging management chip 21, a control terminal of the 2$^{nd}$ second switch component Q6A is connected to the second control signal end SW2, an input terminal of the 2$^{nd}$ second switch component Q6A is connected to the second terminal of the 1$^{st}$ first storage capacitor C1A, and an output terminal of the 2$^{nd}$ second switch component Q6A is connected to the ground terminal GND. In the 2nd switch unit, a control terminal of the 1$^{st}$ second switch component Q7A is connected to the second control signal end SW2, an input terminal of the 1$^{st}$ second switch component Q7A is connected to the first terminal of the 2$^{nd}$ first storage capacitor C2A, an output terminal of the 1$^{st}$ second switch component Q7A is connected to the output terminal VOUT of the first charging management chip 21, a control terminal of the 2nd second switch component Q8A is connected to the second control signal end SW2, an input terminal of the 2$^{nd}$ second switch component Q8A is connected to the second terminal of the 2$^{nd}$ first storage capacitor C2A, and an output terminal of the 2$^{nd}$ second switch component Q8A is connected to the ground terminal GND. In the 3$^{rd}$ switch unit, a control terminal of the 1$^{st}$ second switch component Q9A is connected to the second control signal end SW2, an input terminal of the 1$^{st}$ second switch component Q9A is connected to the first terminal of the 3$^{rd}$ first storage capacitor C3A, an output terminal of the 1$^{st}$ second switch component Q9A is connected to the output terminal VOUT of the first charging management chip 21, a control terminal of the 2$^{nd}$ second switch component Q10A is connected to the second control signal end SW2, an input terminal of the 2$^{nd}$ second switch component Q10A is connected to the second terminal of the 3$^{rd}$ first storage capacitor C3A, and an output terminal of the 2$^{nd}$ second switch component Q10A is connected to the ground terminal GND.

A first terminal of the 4th first storage capacitor C4A is connected to the output terminal VOUT of the first charging management chip 21, and a second terminal of the 4th first storage capacitor C4A is connected to the ground terminal GND.

The switch transistors of the first switch component and the second switch component are N-type transistors.

Figure 4:
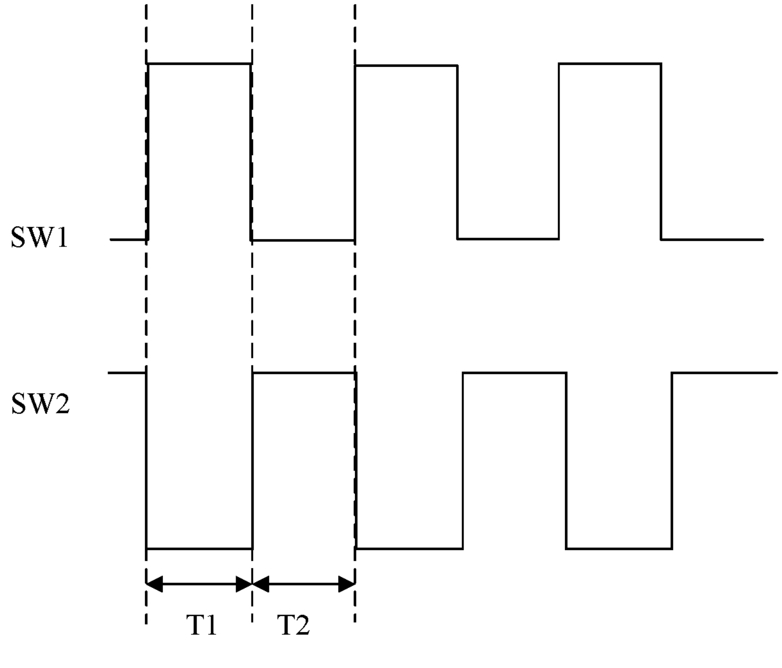
FIG. 4 is a control timing diagram of a first charging management chip.
Figure 5:
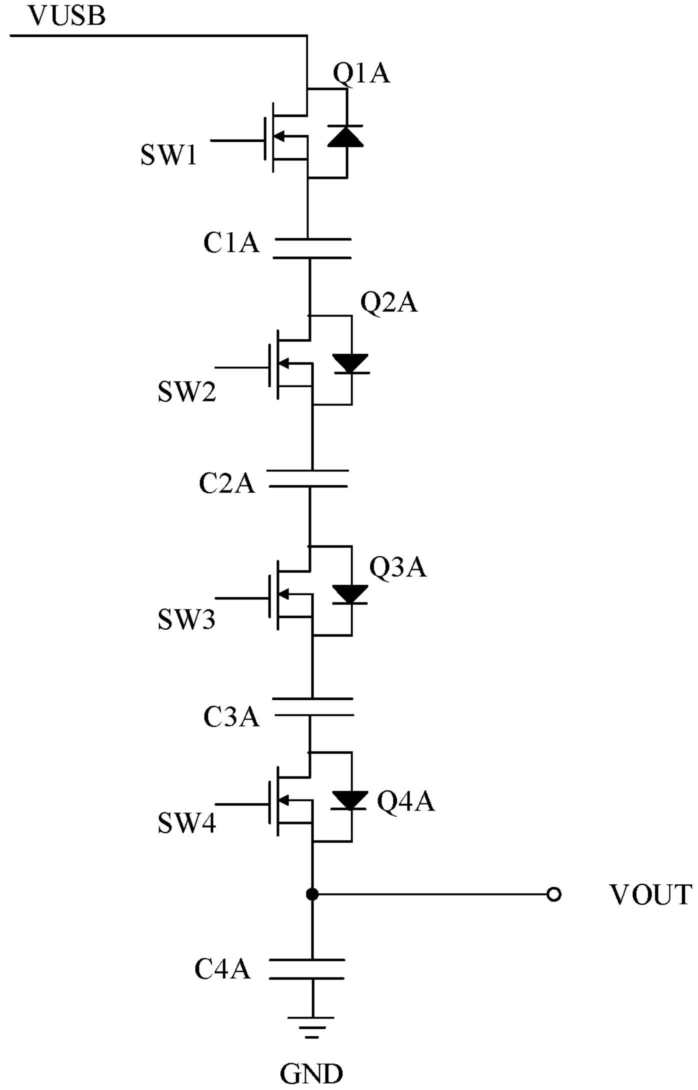
FIG. 5 is a working circuit diagram of a first charging management chip in a first time period.

As shown in FIG. 4, in a first stage T1, the first control signal inputted from the first control signal end SW1 is at a high level, so that the first switch components Q1A, Q2A, Q3A, and Q4A are all closed. Because the second control signal inputted from the second control signal end SW2 is at a low level in the first stage T1, the second switch components Q5A, Q6A. Q7A, Q8A, Q9A, and Q10A are all cut off. In this case, the circuit diagram shown in FIG. 3 is equivalent to the circuit diagram shown in FIG. 5.

It can be learned that in the first stage T1, the four first switch components Q1A, Q2A, Q3A, and Q4A in the first control circuit 211 are all closed to connect the first storage capacitors C1A, C2A, C3A, and C4A in series. VUSB is an input terminal of the first charging management chip 21, which is connected to the charging interface 10 through wiring. If the charging voltage inputted from the charging interface 10 is 20 V, after the charging voltage is divided to the four first storage capacitors connected in series, a voltage difference between two terminals of each of the first storage capacitors is 5 V.

Figure 6:
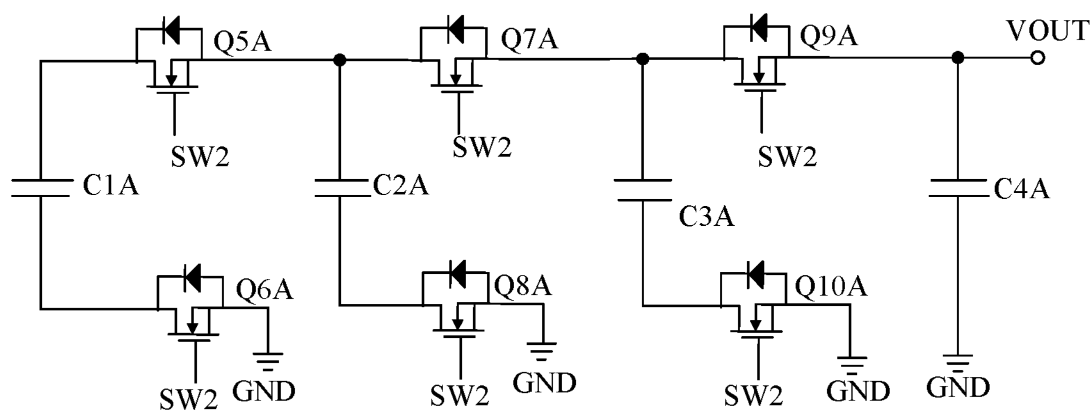
FIG. 6 is a working circuit diagram of a first charging management chip in a second time period.

In a second stage T2, the second control signal inputted from the second control signal end SW2 is at a high level, so that the second switch components Q5A, Q6A, Q7A, Q8A, Q9A, and Q10A are all closed. Because the first control signal inputted from the first control signal end SW1 is at a low level in the second stage T2, the first switch components Q1A, Q2A, Q3A, and Q4A are all cut off. In this case, the circuit diagram shown in FIG. 3 is equivalent to the circuit diagram shown in FIG. 6.

It can be learned that in the second stage T2, the six second switch components Q5A, Q6A, Q7A, Q8A, Q9A, and Q10A in the second control circuit 212 are all closed to connect the first storage capacitors C1A, C2A, C3A, and C4A in parallel, so that a voltage outputted by the output terminal VOUT of the first charging management chip 21 is 5 V.

If power conversion losses of the first charging management chip 21 are ignored, after the first charging management chip 21 reduces the charging voltage from 20 V to 5 V, correspondingly, the first charging management chip 21 may increase a charging current from 5 A to 20 A, that is, a charging voltage inputted to the first charging management chip 21 is 20 V and a charging current is 5 A. After conversion by the first charging management chip 21, an output voltage outputted by the first charging management chip 21 is 5 V and a total output current is 20 A.

According to tests, a power conversion efficiency of the first charging management chip 21 can reach 98%, and the power conversion loss of the first charging management chip 21 is 2%, which is negligible.

In addition, the first charging management chip 21 further includes a protection module 214. The protection module 214 is connected between the input terminal VUSB of the first charging management chip 21 and the first control circuit 211. The protection module includes a first protection transistor Q15, a second protection transistor Q16, an overvoltage protection control module (OVP_CTRL), and a seventh capacitor C7, where the first protection transistor Q15 is configured to perform overvoltage protection (OVP), the second protection transistor Q16 and the seventh capacitor C7 are configured to perform reverse protection.

It should be noted that the first charging management chip 21 may include one first control circuit 211, one second control circuit 212, and N first storage circuits 213. For specific component compositions and connection relationships, refer to the above descriptions. Alternatively, the first charging management chip 21 may also include two parts, each part including one first control circuit 211, one second control circuit 212, and N first storage circuits 213. For example, the four first switch components included in the first control circuit 211 in the first part are Q1A, Q2A, Q3A, and Q4A respectively, the six second switch components included in the second control circuit 212 in the first part are Q5A, Q6A, Q7A, Q8A, Q9A, and Q10A respectively, and the four first storage circuits 213 in the first part are the first storage capacitors C1A, C2A, C3A, and C4A respectively; and the four first switch components included in the first control circuit 211 in the second part are Q1B, Q2B, Q3B, and Q4B respectively, the six second switch components included in the second control circuit 212 in the second part are Q5B, Q6B, Q7B, Q8B, Q9B, and Q10B respectively, and the four first storage circuits 213 in the second part are the first storage capacitors C1B, C2B, C3B, and C4B respectively. A connection relationship of the second part is similar to a connection relationship of the first part. The two parts are connected in parallel, and two output terminals VOUT of the two parts are connected in parallel as the output terminal of the first charging management chip 21, which can correspondingly increase power and reduce current stresses of the parts, and can realize stagger-phase control and reduce an overall output ripple.

It should be noted that the first charging management chip 21 shown in FIG. 3 is a charge pump with a step-down ratio of 4:1. It can be understood that a specific circuit structure of the first charging management chip 21 in the embodiments of this application is not limited to the circuit shown in FIG. 3, and any circuit capable of reducing the charging voltage $V_1$ inputted from the charging interface to $V_1/4$ and increasing the charging current inputted from the charging interface to $4 \times A_1$ may be applied to this application.

Figure 7:
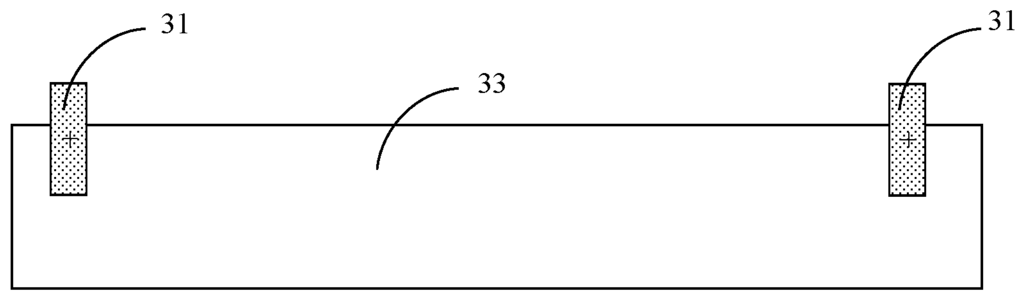
FIG. 7 is a schematic structural diagram of a positive tab in the terminal shown in FIG. 2.
Figure 8:
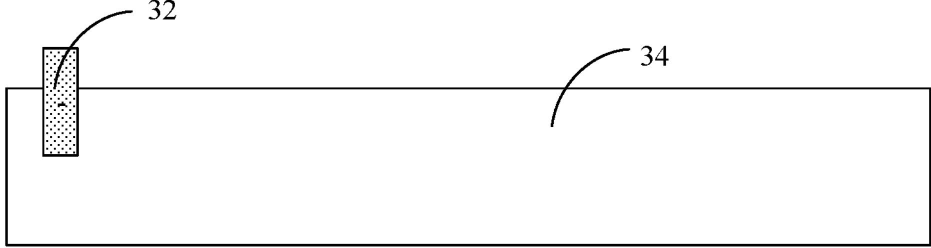
FIG. 8 is a schematic structural diagram of a negative tab in the terminal shown in FIG. 2.

The cell 30, shown in FIG. 2, in which the positive tabs sharing the negative tab 32 are disposed on a same side may be formed by using the positive tabs 31 shown in FIG. 7 and the negative tab 32 shown in FIG. 8. Herein, 33 represents a positive electrode plate, two positive tabs 31 are disposed on the positive electrode plate 33, and the two positive tabs 31 both have one side disposed extending beyond the positive electrode plate 33; and 34 represents a negative electrode plate, one negative tab 32 is disposed on the negative electrode plate 34, and the negative tab 32 also has one side disposed extending beyond the negative electrode plate 34.

A separator is disposed between the positive electrode plate 33 with two positive tabs 31 and the negative electrode plate 34 with one negative tab 32, and the cell 30 shown in FIG. 2 can be obtained by winding the positive electrode plate 33 with two positive tabs 31, the negative electrode plate 34 with one negative tab 32, and the separator. In this way, the two positive tabs 31 and the negative tab 32 are located on a same side, and the two positive tabs 31 share the one negative tab 32.

Figure 9:
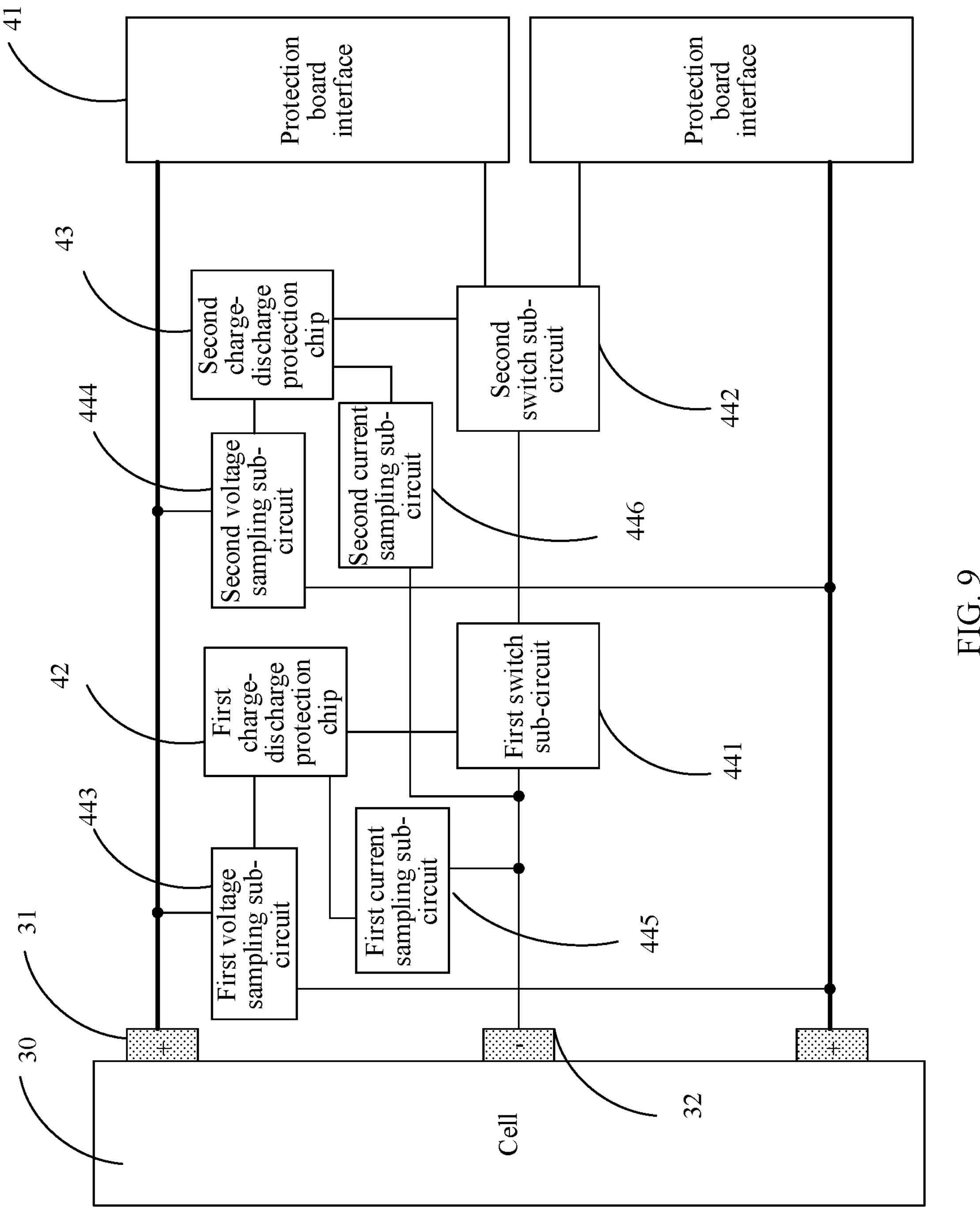
FIG. 9 is a schematic structural diagram of a charge-discharge protection circuit in the terminal shown in FIG. 2.

To implement charge-discharge protection for the cell 30 shown in FIG. 2, a charge-discharge protection circuit shown in FIG. 9 is disposed between the first charging management chip 21 and the tab group of the cell 30, where the charge-discharge protection circuit is located on the battery protection board 40.

As shown in FIG. 9, one end of the charge-discharge protection circuit is connected to the first charging management chip 21 through the protection board interface 41, and the other end of the charge-discharge protection circuit is connected to the tab group on the same side of the cell 30. The charge-discharge protection circuit includes a first charge-discharge protection chip 42, a second charge-discharge protection chip 43, a first switch sub-circuit 441, a second switch sub-circuit 442, a first voltage sampling sub-circuit 443, a second voltage sampling sub-circuit 444, a first current sampling sub-circuit 445, and a second current sampling sub-circuit 446.

The first switch sub-circuit 441 is connected to the negative tab 32 of the cell 30, the first charge-discharge protection chip 42, and the second switch sub-circuit 442, and the second switch sub-circuit 442 is connected to the second charge-discharge protection chip 43 and the two protection board interfaces 41; the first voltage sampling sub-circuit 443 is connected to the two positive tabs 31 (that is, B+) of the cell 30 and the first charge-discharge protection chip 42, and the second voltage sampling sub-circuit 444 is connected to the two positive tabs 31 of the cell 30 and the second charge-discharge protection chip 43; and the first current sampling sub-circuit 445 is connected to the negative tab 32 of the cell 30 and the first charge-discharge protection chip 42, and the second current sampling sub-circuit 446 is connected to the negative tab 32 of the cell 30 and the second charge-discharge protection chip 43.

Figure 10:
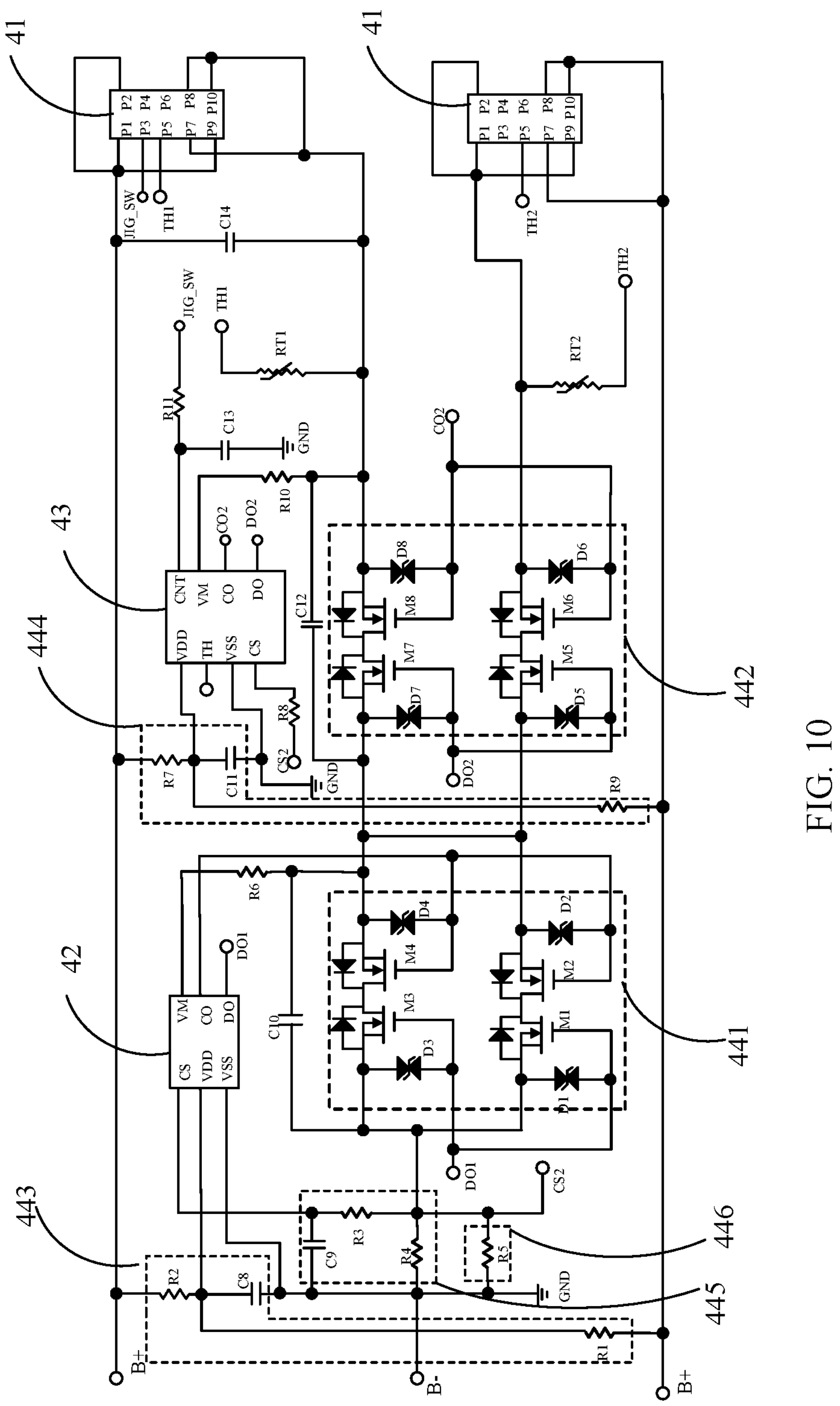
FIG. 10 is a specific circuit diagram of the charge-discharge protection circuit shown in FIG. 9.

Specifically, as shown in FIG. 10, the first switch sub-circuit 441 includes a first switch transistor M1, a second switch transistor M2, a third switch transistor M3, and a fourth switch transistor M4. A gate of the first switch transistor M1 is connected to a DO pin (that is, DO1) of the first charge-discharge protection chip 42, a source of the first switch transistor M1 is connected to the negative tab 32 of the cell 30, and a drain of the first switch transistor M1 is connected to a drain of the second switch transistor M2; a gate of the second switch transistor M2 is connected to a CO pin of the first charge-discharge protection chip 42, and a source of the second switch transistor M2 is connected to the second switch sub-circuit 442; a gate of the third switch transistor M3 is connected to the DO pin of the first charge-discharge protection chip 42, a source of the third switch transistor M3 is connected to the negative tab 32 of the cell 30, and a drain of the third switch transistor M3 is connected to a drain of the fourth switch transistor M4; and a gate of the fourth switch transistor M4 is connected to the CO pin of the first charge-discharge protection chip 42, and a source of the fourth switch transistor M4 is connected to the second switch sub-circuit 442.

The first switch transistor M1, the second switch transistor M2, the third switch transistor M3, and the fourth switch transistor M4 are all transistors with a body diode. In addition, the first switch sub-circuit 44 further includes a first transient voltage suppressor D1 connected to the first switch transistor M1 in parallel, a second transient voltage suppressor D2 connected to the second switch transistor M2 in parallel, a third transient voltage suppressor D3 connected to the third switch transistor M3 in parallel, and a fourth transient voltage suppressor D4 connected to the fourth switch transistor M4 in parallel. Each transient voltage suppressor is reversely broken down when a voltage between two terminals of the transient voltage suppressor is greater than a specific value, to transiently form a conducting loop to conduct a large current between two terminals of the transient voltage suppressor and clamp a voltage between two terminals of the transient voltage suppressor to be a fixed voltage, so as to protect the switch transistor connected to the transient voltage suppressor in parallel.

The second switch sub-circuit 442 includes a fifth switch transistor M5, a sixth switch transistor M6, a seventh switch transistor M7, and an eighth switch transistor M8. A gate of the fifth switch transistor M5 is connected to a DO pin (that is, DO2) of the second charge-discharge protection chip 43, a source of the fifth switch transistor M5 is connected to the first switch sub-circuit 441, and a drain of the fifth switch transistor M5 is connected to a drain of the sixth switch transistor M6; a gate of the sixth switch transistor M6 is connected to a CO pin (that is, CO2) of the second charge-discharge protection chip 43, and a source of the sixth switch transistor M6 is connected to one protection board interface 41; a gate of the seventh switch transistor M7 is connected to the DO pin of the second charge-discharge protection chip 43, a source of the seventh switch transistor M7 is connected to the first switch sub-circuit 441, and a drain of the seventh switch transistor M7 is connected to a drain of the eighth switch transistor M8; and a gate of the eighth switch transistor M8 is connected to the CO pin of the second charge-discharge protection chip 43, and a source of the eighth switch transistor M8 is connected to the other protection board interface 41.

The fifth switch transistor M5, the sixth switch transistor M6, the seventh switch transistor M7, and the eighth switch transistor M8 are also transistors with a body diode. In addition, the second switch sub-circuit 45 further includes a fifth transient voltage suppressor D5 connected to the fifth switch transistor M5 in parallel, a sixth transient voltage suppressor D6 connected to the sixth switch transistor M6 in parallel, a seventh transient voltage suppressor D7 connected to the seventh switch transistor M7 in parallel, and an eighth transient voltage suppressor D8 connected to the eighth switch transistor M8 in parallel.

The first voltage sampling sub-circuit 443 includes a first resistor R1, a second resistor R2, and an eighth capacitor C8. A first terminal of the first resistor R1 is connected to one of the positive tabs 31 of the cell 30, and a second terminal of the first resistor R1 is connected to a first terminal of the eighth capacitor C8, a first terminal of the second resistor R2, and a VDD pin of the first charge-discharge protection chip 42. A second terminal of the eighth capacitor C8 is connected to the negative tab 32 of the cell 30, and a second terminal of the second resistor R2 is connected to the other positive tab 31 of the cell 30. A current voltage value of the cell 30 can be collected through the first voltage sampling sub-circuit 443.

The second voltage sampling sub-circuit 444 includes a seventh resistor R7, a ninth resistor R9, and an eleventh capacitor C11. A first terminal of the ninth resistor R9 is connected to one of the positive tabs 31 of the cell 30, and a second terminal of the ninth resistor R9 is connected to a first terminal of the eleventh capacitor C11, a first terminal of the seventh resistor R7, and a VDD pin of the second charge-discharge protection chip 43. A second terminal of the eleventh capacitor C11 is connected to the ground terminal GND, and a second terminal of the seventh resistor R7 is connected to the other positive tab 31 of the cell 30. A current voltage value of the cell 30 can also be collected through the second voltage sampling sub-circuit 444.

The first current sampling sub-circuit 445 includes a third resistor R3, a fourth resistor R4, and a ninth capacitor C9. A first terminal of the fourth resistor R4 is connected to the negative tab 32 (that is, B−) of the cell 30, a second terminal of the fourth resistor R4 is connected to a first terminal of the third resistor R3, and a second terminal of the third resistor R3 is connected to a CS pin of the first charge-discharge protection chip 42. A first terminal of the ninth capacitor C9 is connected to a first terminal of the fourth resistor R4, and a second terminal of the ninth capacitor C9 is connected to a second terminal of the third resistor R3. The first charge-discharge protection chip 42 can collect a voltage difference between two terminals of the first current sampling sub-circuit 445 through the first current sampling sub-circuit 445. Because resistance values of the third resistor R3 and the fourth resistor R4 in the first current sampling sub-circuit 445 are known, a charging current or discharging current passing through the battery protection board 40 can be detected. In this case, the ninth capacitor C9 mainly implements filtering.

The second current sampling sub-circuit 446 includes a fifth resistor R5 and an eighth resistor R8. A first terminal of the fifth resistor R5 is connected to the negative tab 32 of the cell 30, a second terminal of the fifth resistor R5 is connected to a first terminal of the eighth resistor R8, and a second terminal of the eighth resistor R8 is connected to a CS pin of the second charge-discharge protection chip 43. Correspondingly, the second charge-discharge protection chip 43 can detect, through the second current sampling sub-circuit 446, the charge current or discharge current passing through the battery protection board 40.

During actual use, when the cell 30 operates properly, the CO pin and DO pin of the first charge-discharge protection chip 42 each output a high-level signal to control to close all of the first switch transistor M1, the second switch transistor M2, the third switch transistor M3, and the fourth switch transistor M4. Correspondingly, the CO pin and DO pin of the second charge-discharge protection chip 43 each output a high-level signal to control to close all of the fifth switch transistor M5, the sixth switch transistor M6, the seventh switch transistor M7, and the eighth switch transistor M8.

During discharging of the cell 30, if the first charge-discharge protection chip 42 detects, through the first voltage sampling sub-circuit 443, that an output voltage of the cell 30 is less than an over-discharge protection voltage, it is determined that the cell 30 is in an over-discharged state, and the DO pin of the first charge-discharge protection chip 42 outputs a low-level signal to control to cut off the first switch transistor M1 and the third switch transistor M3. In this way, a discharging loop of the cell 30 is cut off, and the cell 30 stops discharging. Correspondingly, if the second charge-discharge protection chip 43 detects, through the second voltage sampling sub-circuit 444, that an output voltage of the cell 30 is less than an over-discharge protection voltage, it is determined that the cell 30 is in an over-discharged state, and the DO pin of the second charge-discharge protection chip 43 outputs a low-level signal to control to cut off the fifth switch transistor M5 and the seventh switch transistor M7. In this way, a discharging loop of the cell 30 is cut off, and the cell 30 stops discharging.

During charging of the cell 30, if the first charge-discharge protection chip 42 detects, through the first voltage sampling sub-circuit 443, that an output voltage of the cell 30 increases to an over-charge protection voltage, it is determined that the cell 30 is in an over-charged state, the CO pin of the first charge-discharge protection chip 42 outputs a low-level signal to control to cut off the second switch transistor M2 and the fourth switch transistor M4. In this way, a charging loop of the cell 30 is cut off, and the cell 30 stops charging. Correspondingly, if the second charge-discharge protection chip 43 detects, through the second voltage sampling sub-circuit 444, that an output voltage of the cell 30 increases to an over-charge protection voltage, it is determined that the cell 30 is in an over-charged state, and the CO pin of the second charge-discharge protection chip 43 outputs a low-level signal to control to cut off the sixth switch transistor M6 and the eighth switch transistor M8. In this way, a charging loop of the cell 30 is cut off, and the cell 30 stops charging.

During discharging of the cell 30, if the first charge-discharge protection chip 42 detects, through the first current sampling sub-circuit 445, that a discharging current passing through the battery protection board 40 is greater than a preset discharging current, the DO pin of the first charge-discharge protection chip 42 also outputs a low-level signal to control to cut off the first switch transistor M1 and the third switch transistor M3. In this way, a discharging loop of the cell 30 is cut off. Correspondingly, if the second charge-discharge protection chip 43 detects, through the second current sampling sub-circuit 446, that a discharging current passing through the battery protection board 40 is greater than a preset discharging current, the DO pin of the second charge-discharge protection chip 43 also outputs a low-level signal to cut off the fifth switch transistor M5 and the seventh switch transistor M7. In this way, a discharging loop of the cell 30 is cut off.

During charging of the cell 30, if the first charge-discharge protection chip 42 detects, through the first current sampling sub-circuit 445, that a charging current passing through the battery protection board 40 is greater than a preset charging current, the CO pin of the first charge-discharge protection chip 42 also outputs a low-level signal to control to cut off the second switch transistor M2 and the fourth switch transistor M4. In this way, a charging loop of the cell 30 is cut off. Correspondingly, if the second charge-discharge protection chip 43 detects, through the second current sampling sub-circuit 446, that a charging current passing through the battery protection board 40 is greater than a preset charging current, the CO pin of the second charge-discharge protection chip 43 also outputs a low-level signal to control to cut off the sixth switch transistor M6 and the eighth switch transistor M8. In this way, a charging loop of the cell 30 is cut off.

In addition, the charging current or a discharging current of the battery protection board 40 is collected based on the first current sampling sub-circuit 445 and the second current sampling sub-circuit 446 to implement short-circuit protection. Short-circuit protection is an extreme form of over-current protection, and its control process and principle are the same as those of the over-current protection. Short circuit is equivalent to only adding a resistor with a small value (about 0Ω) between the positive tab 31 and the negative tab 32, so that a load current of the battery protection board 40 transiently reaches more than 10 A, and the battery protection board 40 immediately performs over-current protection.

In addition, a charge-discharge protection circuit further includes a sixth resistor R6 and a tenth capacitor C10. A first terminal of the sixth resistor R6 is connected to a VM pin of the first charge-discharge protection chip 42, a second terminal of the sixth resistor R6 is connected to a first terminal of the tenth capacitor C10, and a second terminal of the tenth capacitor C10 is connected to the first switch sub-circuit 441. The sixth resistor R6 mainly limits a current to protect the first charge-discharge protection chip 42 from being damaged by a transient current. The tenth capacitor C10 is to prevent the switch transistor of the first switch sub-circuit 441 from being damaged by static electricity.

Correspondingly, the charge-discharge protection circuit further includes a tenth resistor R10 and a twelfth capacitor C12. A first terminal of the tenth resistor R10 is connected to a VM pin of the second charge-discharge protection chip 43, a second terminal of the tenth resistor R10 is connected to a first terminal of the twelfth capacitor C12, and a second terminal of the twelfth capacitor C12 is connected to the second switch sub-circuit 442. The tenth resistor R10 mainly limits a current to protect the second charge-discharge protection chip 43 from being damaged by a transient current. The twelfth capacitor C12 is to prevent the switch transistor of the second switch sub-circuit 442 from being damaged by static electricity.

In addition, the charge-discharge protection circuit further includes an eleventh resistor R11, a thirteenth capacitor C13, a fourteenth capacitor C14, a first thermistor RT1, and a second thermistor RT2. A first terminal of the eleventh resistor R11 is connected to a CNT pin of the second charge-discharge protection chip 43 and a first terminal of the thirteenth capacitor C13, a second terminal of the eleventh resistor R11 is connected to a JIG_SW pin of one of the protection board interfaces 41, and a second terminal of the thirteenth capacitor C13 is connected to the ground terminal GND. The eleventh resistor R11 and the thirteenth capacitor C13 are filter networks that prevent false triggering. A first terminal of the fourteenth capacitor C14 is connected to one of the positive tabs 31 of the cell 30, and a second terminal of the fourteenth capacitor C14 is connected to the negative tab 32 of the cell 30. A first terminal of the first thermistor RT1 is connected to the second switch sub-circuit 442, and a second terminal of the first thermistor RT1 is connected to a TH1 pin of one of the protection board interfaces 41; and a first terminal of the second thermistor RT2 is connected to the second switch sub-circuit 442, and a second terminal of the second thermistor RT2 is connected to a TH2 pin of the other protection board interface 41. The first thermistor RT1 and the second thermistor RT2 monitor the temperature of the cell 30 mainly by detecting the temperature of the battery protection board 40.

Therefore, during charging or discharging of the cell 30, the charge-discharge protection circuit on the battery protection board 40 performs overvoltage protection, undervoltage protection, short-circuit protection, discharge overcurrent protection, charge overcurrent protection, and the like on the cell 30.

It should be noted that, for the cell 30 with three tabs disposed on a same side, the charge-discharge protection circuit is not limited to the circuit shown in FIG. 10. Any circuit capable of implementing charging and discharging protection for the cell 30 may be applied to this application.

Figure 11:
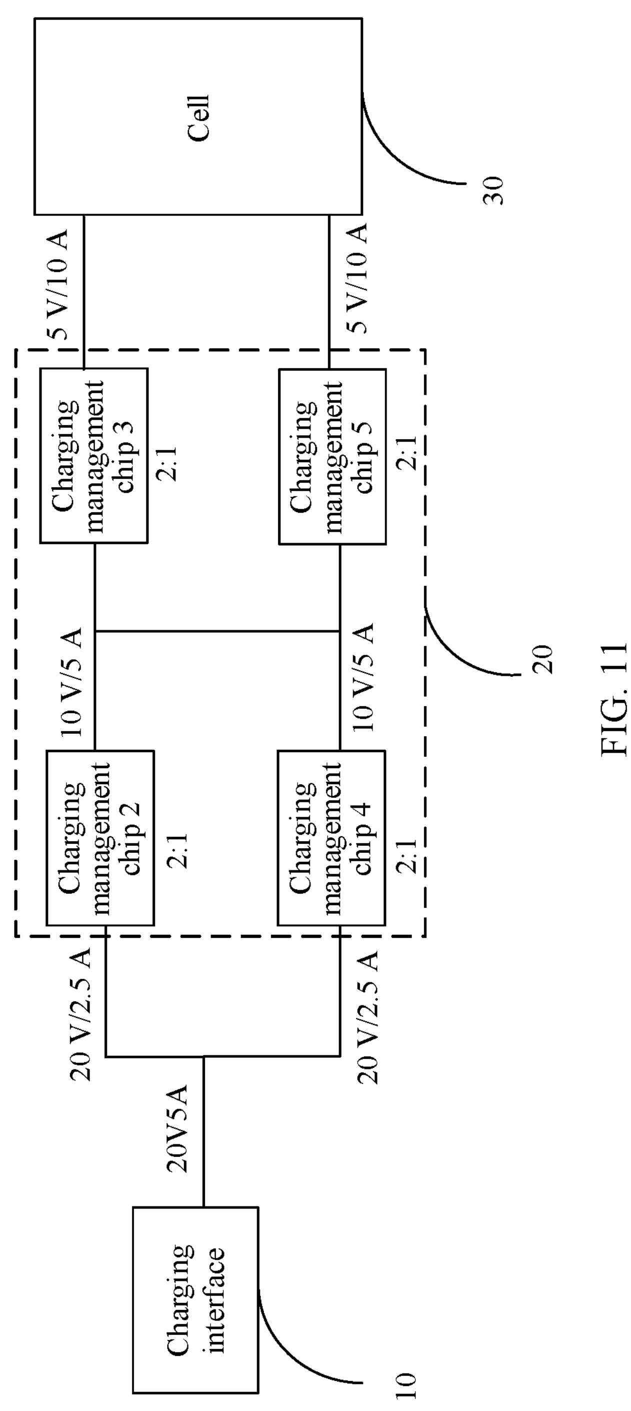
FIG. 11 is a schematic structural diagram of a second charging circuit according to an embodiment of this application.
Figure 12:
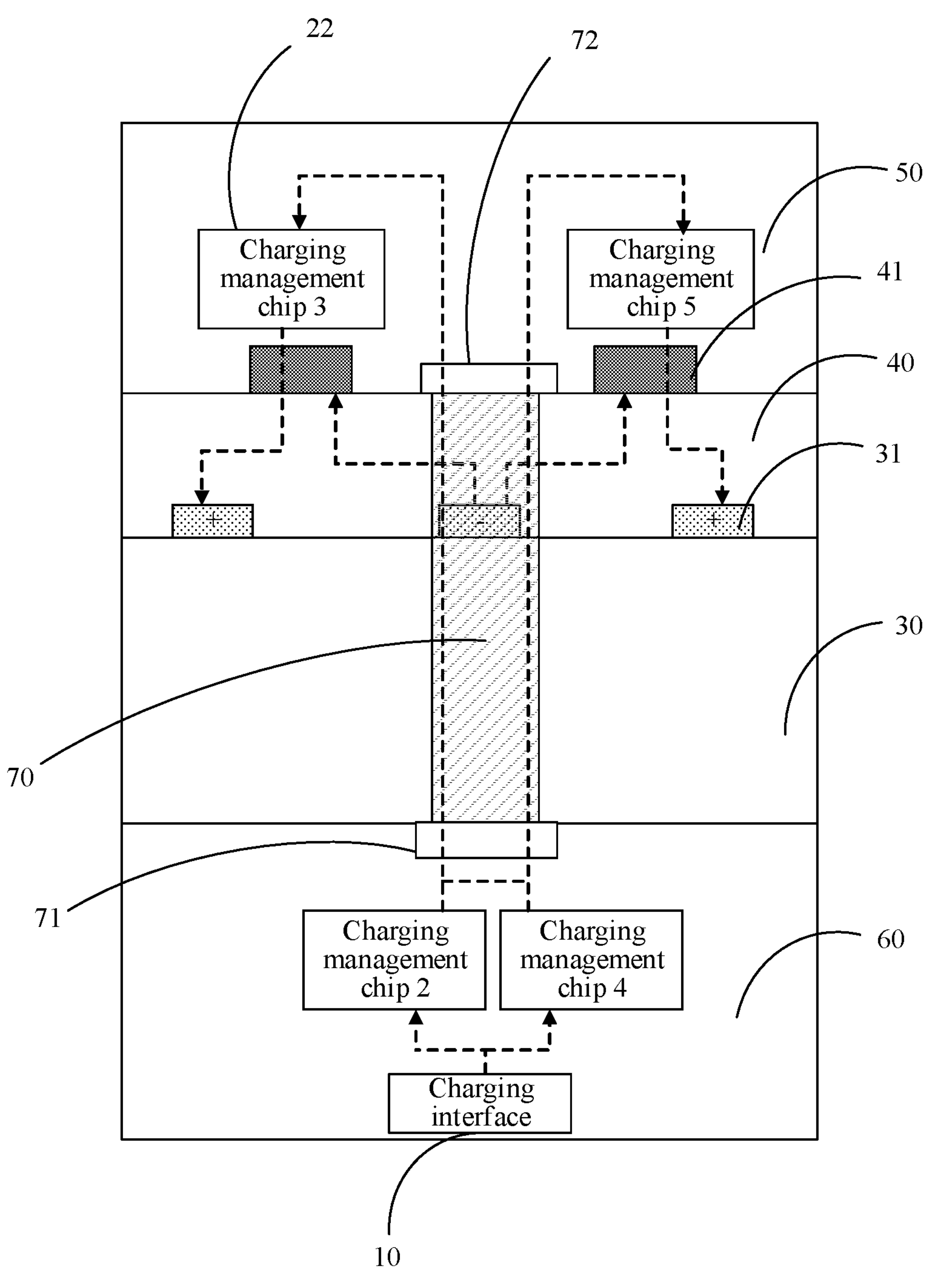
FIG. 12 is an architecture diagram of a terminal corresponding to the charging circuit shown in FIG. 11.

In a second implementation, as shown in FIG. 11 and FIG. 12, the charging circuit includes the charging interface 10, the charging management module 20, and the cell 30. The charging management module 20 includes two charging management units connected in parallel, and the charging management units each include two second charging management chips 22 connected in series. The two second charging management chips 22 connected in series in one of the charging management units are a charging management chip 2 and a charging management chip 3 respectively. The two second charging management chips 22 connected in series in the other charging management unit are a charging management chip 4 and a charging management chip 5 respectively.

Two second charging management chips connected in series are a first management chip and a second management chip respectively, where N equals 4. An input terminal of the first management chip is connected to the charging interface 10, an output terminal of the first management chip is connected to an input terminal of the second management chip, and an output terminal of the second management chip is connected to tab groups located on a same side of a cell body. A transition voltage $V_3$ resulting from stepping down the charging voltage $V_1$ by the first management chip is ½ times the charging voltage $V_1$, and the output voltage $V_2$ resulting from stepping down the transition voltage $V_3$ by the second management chip is ½ times the transition voltage $V_3$.

In this case, the cell 30 also includes the cell body and three tabs, which are respectively two positive tabs 31 and one negative tab 32. The negative tab 32 is located between the two positive tabs 31, and the three tabs form two tab groups. The two tab groups share the negative tab 32, and the two tab groups are located on a same side of the cell body.

As shown in FIG. 12, in an actual product, the charging interface 10, the charging management chip 2, and the charging management chip 4 are all disposed on the micro board 60. The charging management chip 2 is connected to the charging interface 10, the charging management chip 2 is further connected to the connecting circuit board 70 through the first circuit board connecting port 71, the connecting circuit board 70 is connected through the second circuit board connecting port 72 to the charging management chip 3 disposed on the main board 50, and the charging management chip 3 is connected to the battery protection board 40 through one of the protection board interfaces 41. The charging management chip 4 is also connected to the charging interface 10, the charging management chip 4 is further connected to the connecting circuit board 70 through the first circuit board connecting port 71, the connecting circuit board 70 is connected through the second circuit board connecting port 72 to the charging management chip 5 disposed on the main board 50, the charging management chip 5 is connected to the battery protection board 40 through the other protection board interface 41, and the battery protection board 40 is then connected to the tab groups of the cell 30.

Therefore, after a charger is connected to the charging interface 10, the charger outputs a charging voltage of 20 V and a charging current of 5 A, and the charging current is divided on the micro board 60, so that voltages inputted to the charging management chip 2 and the charging management chip 4 are both 20 V, and currents are both 2.5 A. The charging management chip 2 converts the inputted voltage of 20 V at a step-down ratio of 2:1, a converted transition voltage is 10 V, and a converted transition current is 5 A. Correspondingly, the charging management chip 4 converts the inputted voltage of 20 V at a step-down ratio of 2:1, a converted transition voltage is also 10 V, and a converted transition current is also 5 A. The transition current and transition voltage resulting from conversion by the charging management chip 2 enter the charging management chip 3 by sequentially passing through the first circuit board connecting port 71, the connecting circuit board 70, the second circuit board connecting port 72, and the main board 50. The charging management chip 3 converts the transition voltage of 10 V at a step-down ratio of 2:1, a converted output voltage is 5 V, and a converted output current is 10 A. Correspondingly, the transition current and transition voltage resulting from conversion by the charging management chip 4 enter the charging management chip 5 by sequentially passing through the first circuit board connecting port 71, the connecting circuit board 70, the second circuit board connecting port 72, and the main board 50. The charging management chip 5 converts the transition voltage of 10 V at a step-down ratio of 2:1, a converted output voltage is 5 V, and a converted output current is 10 A. Then, the output voltage and output current outputted by the charging management chip 3 pass through one of the protection board interfaces 41 (for example, the protection board interface 41 on the left side in FIG. 12) to enter the battery protection board 40, and then flow into the positive tab 31 in one of the tab groups (for example, the tab group formed by the positive tab 31 on the left side in FIG. 12 and the shared negative tab 32). The output voltage and output current outputted by the charging management chip 5 pass through the other protection board interface 41 (for example, the protection board interface 41 on the right side in FIG. 12) to enter the battery protection board 40, and then flow into the positive tab 31 in the other tab group (for example, the tab group formed by the positive tab 31 on the right side in FIG. 12 and the shared negative tab 32). In this case, a specified voltage flowing into each of the tab groups is 5 V, and a specified current flowing into each of the tab groups is 10 A.

In this case, a converted output voltage of the charging management module 20 is 5 V, and a total output current is a sum of the output currents of the charging management chip 3 and the charging management chip 5, that is, the total output current is 20 A. In addition, the two tab groups of the cell 30 are connected in parallel, the specified voltage inputted to each of the tab groups is 5 V, and the specified current inputted is 10 A. In this case, a voltage inputted to the cell 30 is 5 V, and a total current inputted to the cell 30 is 20 A.

Because a step-down ratio of the second charging management chip 22 in FIG. 11 and FIG. 12 is 2:1, two second charging management chips 22 with a step-down ratio of 2:1 need to be connected in series, so that the charging voltage $V_1$ inputted from the charging interface 10 is 4 times the output voltage $V_2$ outputted by the charging management module 20.

In this case, the charging management module 20 includes two charging management units connected in parallel. The charging management chip 2 and the charging management chip 3 form one of the charging management units, where a first management chip is the charging management chip 2, and a second management chip is the charging management chip 3. An input terminal of the charging management chip 2 is connected to the charging interface 10, an output terminal of the charging management chip 2 is connected to an input terminal of the charging management chip 3, and an output terminal of the charging management chip 3 is connected to one of the tab groups. The charging management chip 4 and the charging management chip 5 form the other charging management unit, where a first management chip is the charging management chip 4, and a second management chip is the charging management chip 5. An input terminal of the charging management chip 4 is connected to the charging interface 10, an output terminal of the charging management chip 4 is connected to an input terminal of the charging management chip 5, and an output terminal of the charging management chip 5 is connected to the other tab group. In addition, the charging management chip 2 and the charging management chip 4 are connected in parallel, so that the two charging management units are connected in parallel.

Certainly, the charging management module 20 may alternatively include one charging management unit. The charging management unit further includes two second charging management chips 22 connected in series, for example, includes only the charging management chip 2 and the charging management chip 3 that are connected in series in FIG. 12 or includes only the charging management chip 4 and the charging management chip 5 that are connected in series in FIG. 12.

In a case that the charging management module 20 includes one charging management unit, the charging management unit includes the charging management chip 2 and the charging management chip 3 that are connected in series, where the charging management chip 2 is referred to as a first management chip, and the charging management chip 3 is referred to as a second management chip. In this case, the output terminal of the charging management chip 3 needs to be connected to two tab groups located on a same side of the cell body. In a case that the charging management module 20 includes one charging management unit, the charging management unit includes the charging management chip 4 and the charging management chip 5 that are connected in series, where the charging management chip 4 is referred to as a first management chip, and the charging management chip 5 is referred to as a second management chip. In this case, the output terminal of the charging management chip 5 needs to be connected to two tab groups located on a same side of the cell body.

Figure 13:
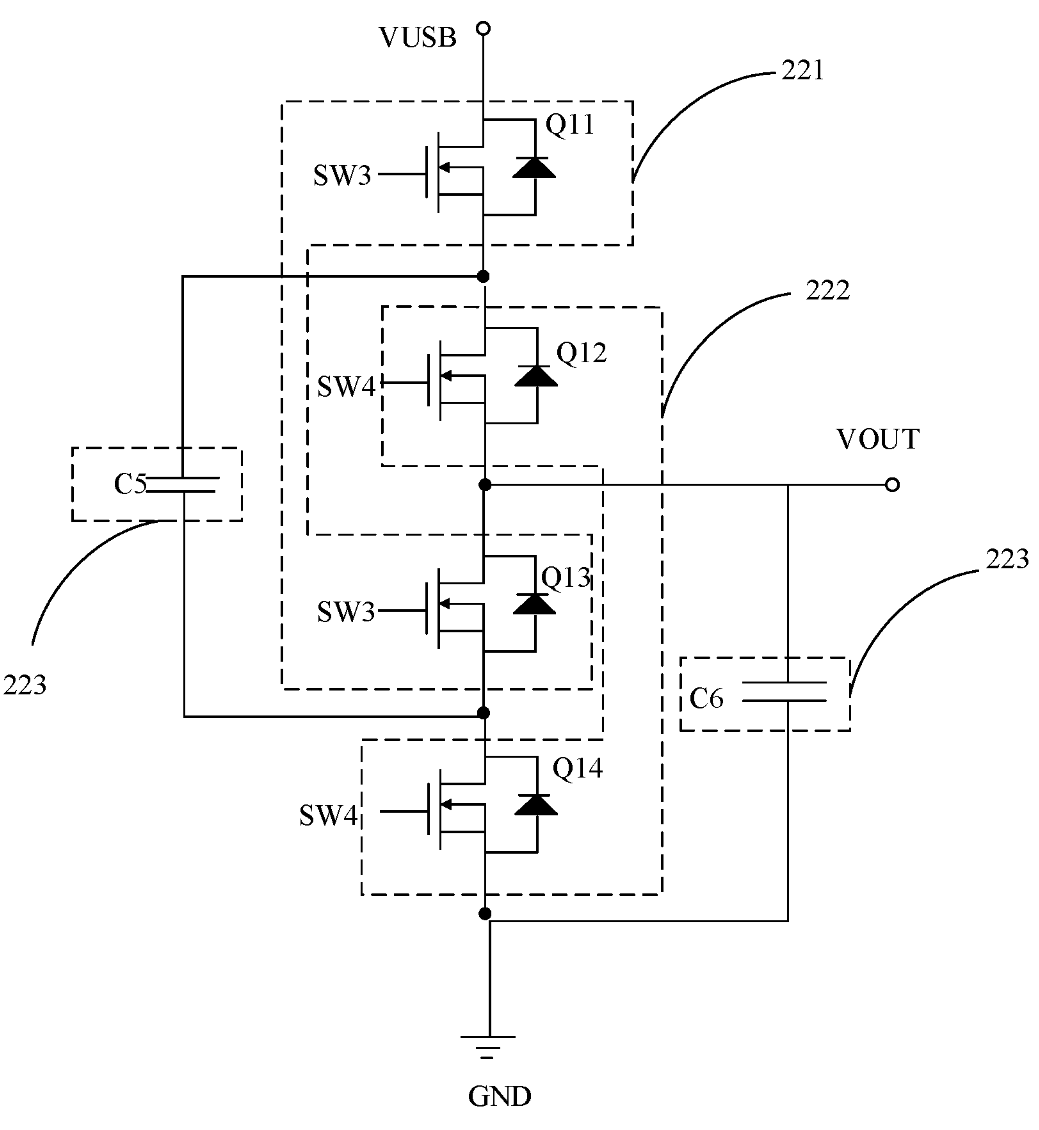
FIG. 13 is a circuit diagram of a second charging management chip.

As shown in FIG. 13, the second charging management chips 22 each include a third control circuit 221, a fourth control circuit 222, and two second storage circuits 223; the third control circuit 221 is connected to a third control signal end SW3 and the two second storage circuits 223 and is configured to be closed under an action of a third control signal inputted from the third control signal end SW3 to connect the two second storage circuits 223 in series; and the fourth control circuit 222 is connected to a fourth control signal end SW4 and the two second storage circuits 223 and is configured to be closed under an action of a fourth control signal inputted from the fourth control signal end SW4 to connect the two second storage circuits 223 in parallel; where the third control signal and the fourth control signal are phase inversion signals.

The third control circuit 211 includes two third switch components (for example, Q11 and Q13), an input terminal of the $1^{st}$ third switch component Q11 is connected to the charging interface 10, an output terminal of the $1^{st}$ third switch component Q11 is connected to a first terminal of the $1^{st}$ second storage circuit 223, an input terminal of the $2^{nd}$ third switch component Q13 is connected to a second terminal of the $1^{st}$ second storage circuit 223, an output terminal of the $2^{nd}$ third switch component Q13 is connected to a first terminal of the $2^{nd}$ second storage circuit 223 and the output terminal VOUT of the second charging management chip 22, and a second terminal of the $2^{nd}$ second storage circuit 223 is connected to the ground terminal GND. The fourth control circuit 222 includes two fourth switch components (for example, Q12 and Q14), an input terminal of the $1^{st}$ fourth switch component Q12 is connected to the first terminal of the $1^{st}$ second storage circuit 223, an output terminal of the $1^{st}$ fourth switch component Q12 is connected to the output terminal VOUT of the second charging management chip 22, an input terminal of the $2^{nd}$ fourth switch component Q14 is connected to the second terminal of the $1^{st}$ second storage circuit 223, and an output terminal of the $2^{nd}$ fourth switch component Q14 is connected to the ground terminal GND; where the second storage circuits 223 each include a second storage capacitor (for example, C5 or C6), and the third switch component and the fourth switch component are switch transistors with a body diode.

If a step-down ratio of each second charging management chip 22 is 2:1, a quantity of second storage circuits 223 in the second charging management chip 22 is 2, and the second storage capacitors included in the two second storage circuits 223 are C5 and C6 respectively. A quantity of third switch components included in the third control circuit 221 is also 2, and the two third switch components are Q11 and Q13 respectively. A quantity of fourth switch components included in the fourth control circuit 222 is also 2, and the two fourth switch components are Q12 and Q14 respectively.

A control terminal of the third switch component Q11 and a control terminal of the third switch component Q13 are both connected to the third control signal end SW3, and a control terminal of the fourth switch component Q12 and a control terminal of the fourth switch component Q14 are both connected to the fourth control signal end SW4. The third switch component and the fourth switch component are N-type transistors.

Figure 14:
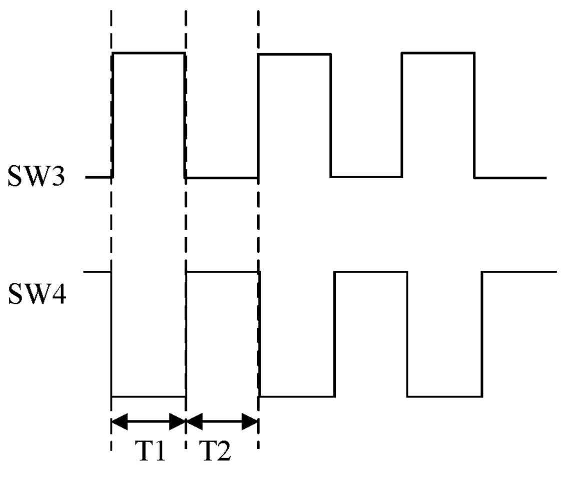
FIG. 14 is a control timing diagram of a second charging management chip.
Figure 15:
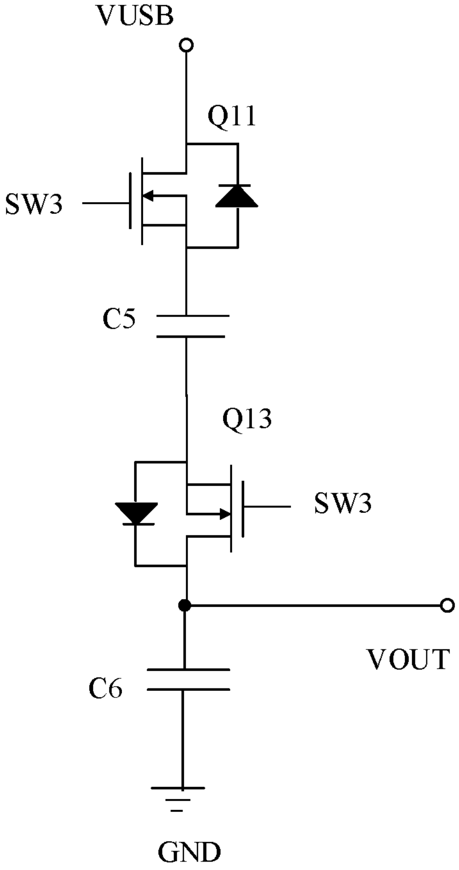
FIG. 15 is a working circuit diagram of a second charging management chip in a first time period.

As shown in FIG. 14, in a first stage T1, the third control signal inputted from the third control signal end SW3 is at a high level, so that the third switch components Q11 and Q13 are both closed. Because the fourth control signal inputted from the fourth control signal end SW4 is at a low level in the first stage T1, the fourth switch components Q12 and Q14 are both cut off. In this case, the circuit diagram shown in FIG. 13 is equivalent to the circuit diagram shown in FIG. 15.

It can be learned that in the first stage T1, the two third switch components Q11 and Q13 of the third control circuit 221 are both closed to connect the second storage capacitors C5 and C6 in series. VUSB is an input terminal of the second charging management chip 22, and is connected to the charging interface 10 or an output terminal of a former second charging management chip 22 through wiring. If VUSB in FIG. 13 is connected to the charging interface 10, and a charging voltage inputted from the charging interface 10 is 20 V, after the charging voltage is divided to the two second storage capacitors connected in series, a voltage difference between two terminals of each of the second storage capacitors is 10 V. If VUSB in FIG. 13 is connected to the output terminal of the former second charging management chip 22, and a transition voltage outputted by the output terminal of the former second charging management chip 22 is 10 V, after the transition voltage is divided to the two second storage capacitors connected in series, a voltage difference between two terminals of each of the second storage capacitors is 5 V.

Figure 16:
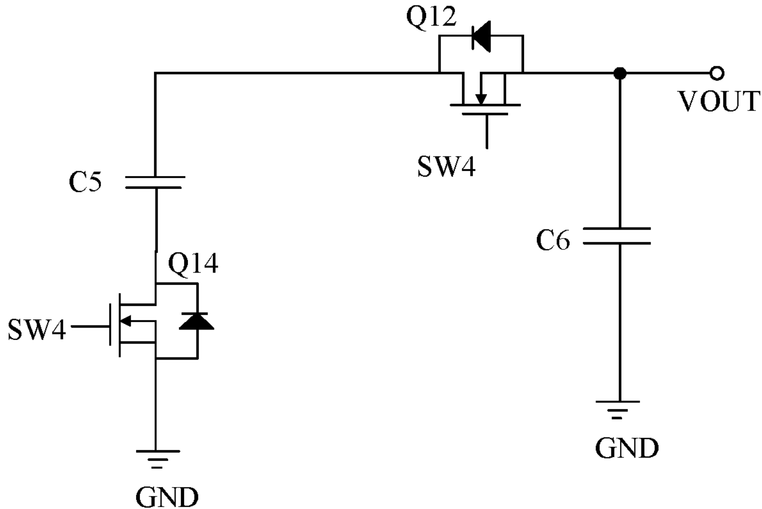
FIG. 16 is a working circuit diagram of a second charging management chip in a second time period.

In a second stage T2, the fourth control signal inputted from the fourth control signal end SW4 is at a high level, so that the fourth switch components Q12 and Q14 are both closed. Because the third control signal inputted from the third control signal end SW3 is at a low level in the second stage T2, the third switch components Q11 and Q13 are both cut off. In this case, the circuit diagram shown in FIG. 13 is equivalent to the circuit diagram shown in FIG. 16.

It can be learned that in the second stage T2, the two fourth switch components Q12 and Q14 of the fourth control circuit 222 are both closed to connect the second storage capacitors C5 and C6 in parallel. When the voltage difference between two terminals of each of the second storage capacitors is 10 V in the first stage T1, a voltage outputted by the output terminal VOUT of the second charging management chip 22 is 10 V. When the voltage difference between two terminals of each of the second storage capacitors is 5 V in the first stage T1, a voltage outputted by the output terminal VOUT of the second charging management chip 22 is 5 V.

If power conversion losses of the second charging management chip 22 are ignored, after the second charging management chip 22 reduces the charging voltage from 20 V to 10 V, correspondingly, the second charging management chip 22 can increase a charging current from 2.5 A to 5 A; or after the second charging management chip 22 reduces the transition voltage from 10 V to 5 V, correspondingly, the second charging management chip 22 can increase a transition current from 5 A to 10 A. Therefore, the charging voltage of 20 V inputted from the charging interface 10 may be converted twice by the two second charging management chips 22 connected in series, to obtain an output voltage of 5 V. In this case, a specified voltage flowing into each of the tab groups is 5 V. In addition, a total output current of the charging management module 20 converted by the two second charging management chips 22 connected in series is 20 A. The total output current is divided to flow into the two tab groups, so that a specified current flowing into each of the tab groups is 10 A.

In this case, maximum charging power inputted by the charger to the charging interface 10 is 20 V×5 A=100 W. If conversion efficiency losses of the charging management chip and circuit losses on the charging circuit are ignored, power inputted to the cell 30 through each of the tab groups is a product of the specified voltage and the specified current, that is, 5 V×10 A=50 W, and therefore power inputted through the two tab groups to the cell 30 is 50 W+50 W=100 W.

According to tests, a power conversion efficiency of the charging management module 20 shown in FIG. 11 and FIG. 12 can reach 98%, and power conversion loss of the charging management module 20 is 2%, which is negligible. It should be noted that a protection module 211 may be further disposed in the second charging management chip 22 that is in the charging management module 20 and that is directly connected to the charging interface 10. The protection module 211 is connected between the input terminal VUSB of the second charging management chip 22 and the third control circuit 221. For a specific composition of the protection module 211, reference may be made to FIG. 3, and details are not further described herein to avoid repetition. In addition, each of the second charging management chips 22 may also include two parts that are connected in parallel. Components of each part are shown in FIG. 13.

In addition, the second charging management chip 22 shown in FIG. 13 is a charge pump with a step-down ratio of 2:1. It can be understood that the second charging management chip 22 in the embodiments of this application is not limited to the circuit shown in FIG. 13, and any circuit capable of implementing a step-down ratio of 2:1 and a current-increasing ratio of 1:2 may be applied to this application.

For a specific structure of the charge-discharge protection circuit on the battery protection board 40, reference may be made to the first implementation, and details are not further described herein to avoid repetition.

Figure 17:
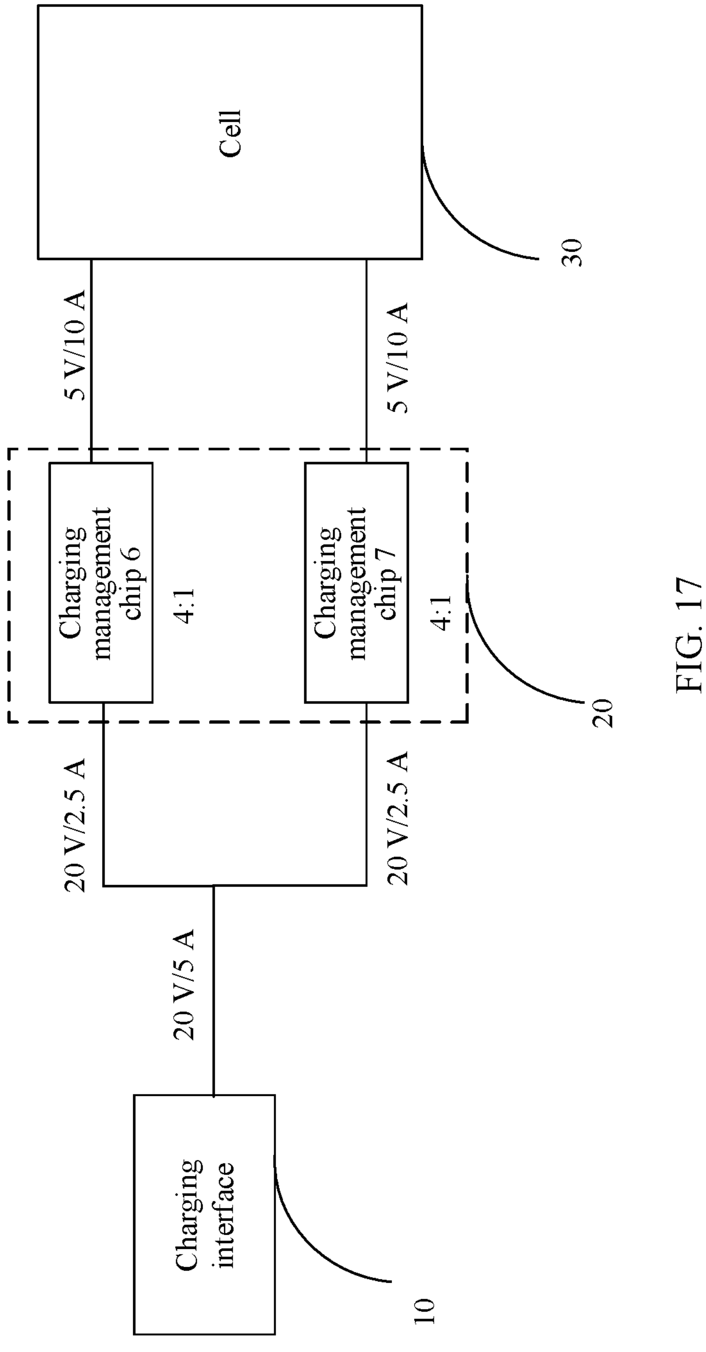
FIG. 17 is a schematic structural diagram of a third charging circuit according to an embodiment of this application.
Figure 18:
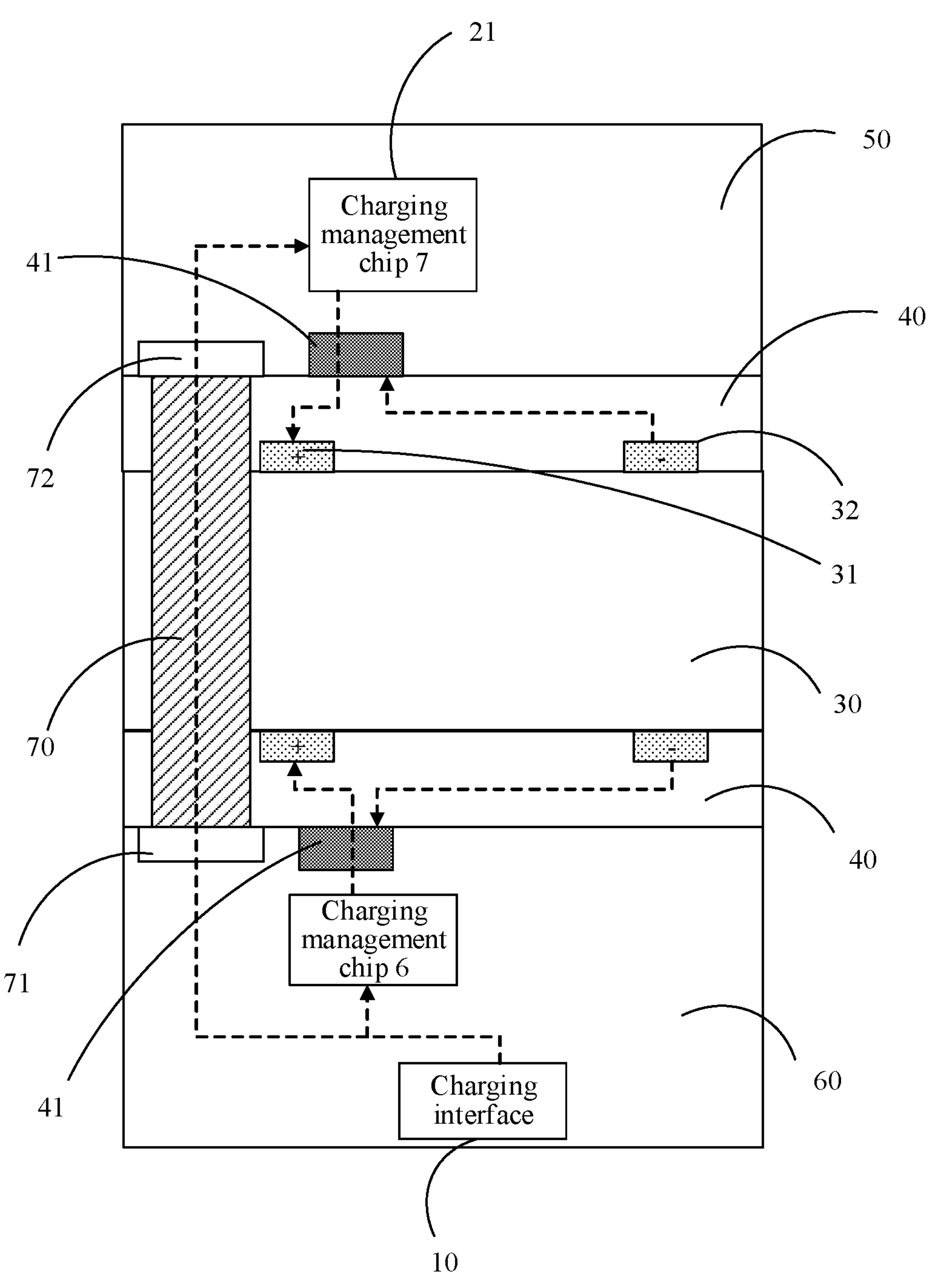
FIG. 18 is an architecture diagram of a terminal corresponding to the charging circuit shown in FIG. 17.

In a third implementation, as shown in FIG. 17 and FIG. 18, the charging circuit includes the charging interface 10, the charging management module 20, and the cell 30. The charging management module 20 includes two first charging management chips 21, for example, the two first charging management chips 21 are a charging management chip 6 and a charging management chip 7 respectively. The charging management chip 6 is connected to tab groups located on a same side of a cell body, and the charging management chip 7 is also connected to tab groups located on a same side of the cell body.

In this case, the cell 30 includes the cell body and four tabs, which are two positive tabs 31 and two negative tabs 32 respectively. One of the positive tabs 31 and one of the negative tabs 32 form one tab group, and the other positive tab 31 and the other negative tab 32 form another tab group. The cell 30 includes the two tab groups, where one of the tab groups is located on a first side of the cell body, the other tab group is located on a second side of the cell body, and the first side and the second side are opposite sides of the cell body. In other words, the first side and the second side of the cell body both include one tab group.

As shown in FIG. 18, in an actual product, the two tab groups of the cell 30 are distributed on two sides of the cell body, and therefore a quantity of first charging management chips 21 in the charging management module 20 is also 2. In other words, the quantity of first charging management chips 21 in the charging management module 20 is equal to a quantity of sides on which the tab groups of the cell 30 are distributed. In addition, in a case that the two tab groups are distributed on both sides of the cell body, two battery protection boards 40 need to be disposed. One of the battery protection boards 40 is disposed between the micro board 60 and the cell 30, the other battery protection board 40 is disposed between the main board 50 and the cell 30, and the battery protection boards 40 each have one protection board interface 41.

The charging interface 10 and the charging management chip 6 are disposed on the micro board 60, an input terminal of the charging management chip 6 is connected to the charging interface 10, an output terminal of the charging management chip 6 is connected to the battery protection board 40 (a battery protection board located between the micro board 60) and the cell 30) through the protection board interface 41, and the battery protection board 40 is then connected to the positive tab 31 and the negative tab 32 on a side of the cell 30 closer to the micro board 60. The charging interface 10 is further sequentially connected to the first circuit board connecting port 71, the connecting circuit board 70, the second circuit board connecting port 72, and the charging management chip 7 disposed on the main board 50 through wiring on the micro board 60. An output terminal of the charging management chip 7 is connected to the battery protection board 40 (a battery protection board located between the main board 50) and the cell 30) through the protection board interface 41, and the battery protection board 40 is then connected to the positive tab 31 and the negative tab 32 on a side of the cell 30 closer to the main board 50.

In this case, step-down ratios of the charging management chip 6 and the charging management chip 7 are both 4:1, that is, N equals 4. The charging management chip 6 steps down a charging voltage $V_1$ inputted from the charging interface, and an output voltage $V_2$ resulting from the step-down is ¼ times the charging voltage $V_1$. The charging management chip 7 steps down a charging voltage $V_1$ inputted from the charging interface, and an output voltage $V_2$ resulting from the step-down is ¼ times the charging voltage $V_1$.

Therefore, after a charger is connected to the charging interface 10, the charger outputs a charging voltage of 20 V and a charging current of 5 A, and the charging current is divided on the micro board 60. One of the currents is inputted to the charging management chip 6, and the other current passes through the first circuit board connecting port 71, the connecting circuit board 70, and the second circuit board connecting port 72 to enter the charging management chip 7 disposed on the main board 50, so that a voltage inputted to the charging management chip 6 is 20 V and a current is 2.5 A, and a voltage inputted to the charging management chip 7 is also 20 V and a current is also 2.5 A. The charging management chip 6 converts the charging voltage of 20 V at a step-down ratio of 4:1, the converted output voltage is 5 V, and the converted output current is 10 A. Then, the charging management chip 6 outputs the output voltage and output current to the battery protection board 40 between the micro board 60 and the cell 30 through the protection board interface 41, and provides, via the battery protection board 40, the output voltage and output current to the positive tab 31 and negative tab 32 of the cell 30 on a side closer to the micro board 60. Correspondingly, the charging management chip 7 converts the charging voltage of 20 V at a step-down ratio of 4:1, the converted output voltage is 5 V, and the converted output current is 10 A. Then, the charging management chip 7 outputs the output voltage and output current to the battery protection board 40 between the main board 50 and the cell 30 through the protection board interface 41, and provides, via the battery protection board 40, the output voltage and output current to the positive tab 31 and the negative tab 32 of the cell 30 on a side closer to the main board 50. In this case, a specified voltage flowing into each of the tab groups is 5 V, and a specified current flowing into each of the tab groups is 10 A.

In this case, a converted output voltage of the charging management module 20 is 5 V, and a total output current is a sum of the output currents of the charging management chip 6 and the charging management chip 7, that is, the total output current is 20 A. In addition, the two tab groups of the cell 30 are connected in parallel, the specified voltage inputted to each of the tab groups is 5 V, and the specified current inputted to each of the tab groups is 10 A. Therefore, a voltage inputted to the cell 30 is 5 V, a total current inputted to the cell 30 is 20 A, and charging power is 100 W.

For a specific composition and step-down process of the first charging management chip 21, reference may be made to the first implementation, and details are not further described herein to avoid repetition.

Figure 19:
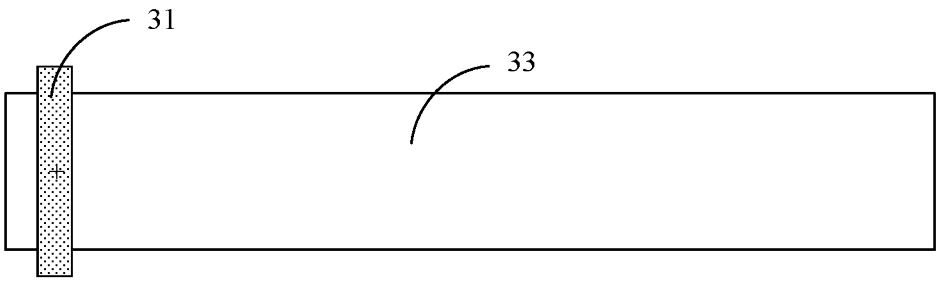
FIG. 19 is a schematic structural diagram of a positive tab in the terminal shown in FIG. 18.
Figure 20:
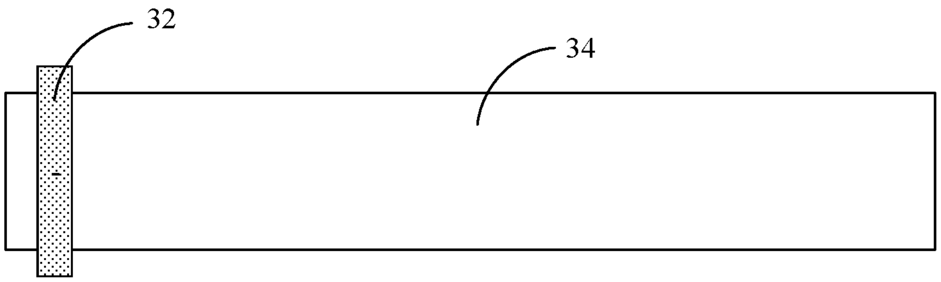
FIG. 20 is a schematic structural diagram of a negative tab in the terminal shown in FIG. 18.

The cell 30, shown in FIG. 18, in which the positive tabs not sharing a tab are disposed on different sides may be formed by using the positive tab 31 shown in FIG. 19 and the negative tab 32 shown in FIG. 20. Herein, 33 represents a positive electrode plate, one positive tab 31 is disposed on the positive electrode plate 33, and both ends of the positive tab 31 are disposed extending beyond the positive electrode plate 33; and 34 represents a negative electrode plate, one negative tab 32 is disposed on the negative electrode plate 34, and both ends of the negative tab 32 are also disposed extending beyond the positive electrode plate 33.

A separator is disposed between the positive electrode plate 33 with one positive tab 31 and the negative electrode plate 34 with one negative tab 32, and the cell 30 shown in FIG. 18 can be obtained by winding the positive electrode plate 33 with one positive tab 31, the negative electrode plate 34 with one negative tab 32, and the separator. In this way, one tab group is located on a first side, and the other tab group is located on a second side.

Figure 21:
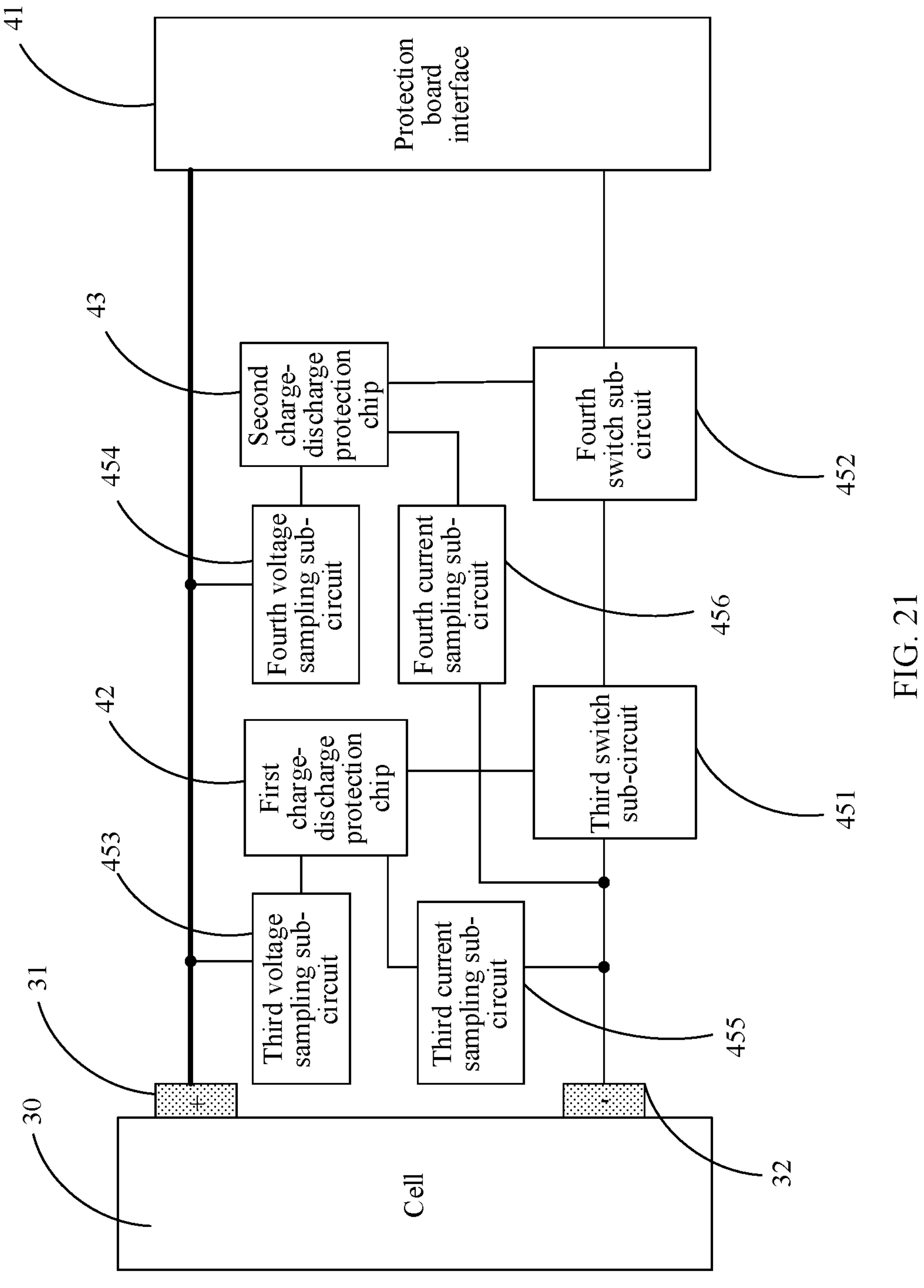
FIG. 21 is a schematic structural diagram of a charge-discharge protection circuit in the terminal shown in FIG. 18.

To implement charge-discharge protection for the cell 30 shown in FIG. 18, a charge-discharge protection circuit shown in FIG. 21 is disposed between the first charging management chip 21 and the tab group of the cell 30, where the charge-discharge protection circuit is located on the battery protection board 40.

As shown in FIG. 21, one end of the charge-discharge protection circuit is connected to the first charging management chip 21 through the protection board interface 41, and the other end of the charge-discharge protection circuit is connected to the tab group on the same side of the cell 30. The charge-discharge protection circuit includes a first charge-discharge protection chip 42, a second charge-discharge protection chip 43, a third switch sub-circuit 451, a fourth switch sub-circuit 452, a third voltage sampling sub-circuit 453, a fourth voltage sampling sub-circuit 454, a third current sampling sub-circuit 455, and a fourth current sampling sub-circuit 456.

The third switch sub-circuit 451 is connected to the negative tab 32 of the cell 30, the first charge-discharge protection chip 42, and the fourth switch sub-circuit 452, and the fourth switch sub-circuit 452 is connected to the second charge-discharge protection chip 43 and the protection board interface 41; the third voltage sampling sub-circuit 453 is connected to the positive tab 31 (that is, B+) of the cell 30 and the first charge-discharge protection chip 42, and the fourth voltage sampling sub-circuit 454 is connected to the positive tab 31 of the cell 30) and the second charge-discharge protection chip 43; and the third current sampling sub-circuit 455 is connected to the negative tab 32 of the cell 30 and the first charge-discharge protection chip 42, and the fourth current sampling sub-circuit 456 is connected to the negative tab 32 of the cell 30 and the second charge-discharge protection chip 43.

Figure 22:
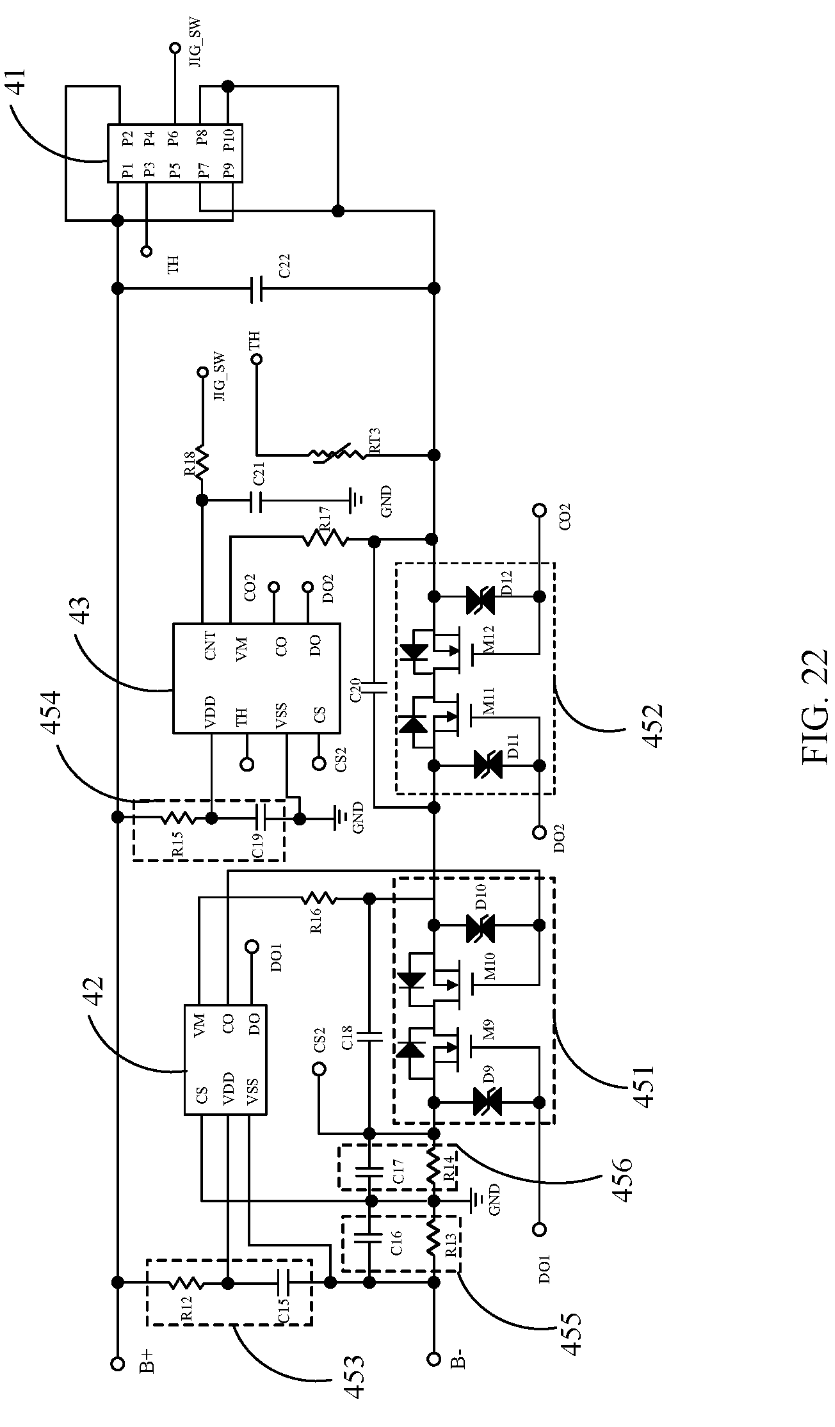
FIG. 22 is a specific circuit diagram of the charge-discharge protection circuit shown in FIG. 19.

Specifically, as shown in FIG. 22, the third switch sub-circuit 451 includes a ninth switch transistor M9 and a tenth switch transistor M10. A gate of the ninth switch transistor M9) is connected to a DO pin (that is, DO1) of the first charge-discharge protection chip 42, a source of the ninth switch transistor M9 is connected to the negative tab 32 of the cell 30, and a drain of the ninth switch transistor M9 is connected to a drain of the tenth switch transistor M10; and a gate of the tenth switch transistor M10 is connected to a CO pin of the first charge-discharge protection chip 42, and a source of the tenth switch transistor M10 is connected to the fourth switch sub-circuit 452.

The ninth switch transistor M9 and the tenth switch transistor M10 are transistors with a body diode. In addition, the third switch sub-circuit 451 further includes a ninth transient voltage suppressor D9 connected to the ninth switch transistor M9 in parallel, and a tenth transient voltage suppressor D10 connected to the tenth switch transistor M10 in parallel.

The fourth switch sub-circuit 452 includes an eleventh switch transistor M11 and a twelfth switch transistor M12. A gate of the eleventh switch transistor M11 is connected to a DO pin (that is, DO2) of the second charge-discharge protection chip 43, a source of the eleventh switch transistor M11 is connected to the third switch sub-circuit 451, and a drain of the eleventh switch transistor M11 is connected to a drain of the twelfth switch transistor M12: and a gate of the twelfth switch transistor M12 is connected to a CO pin (that is, CO2) of the second charge-discharge protection chip 43, and a source of the twelfth switch transistor M12 is connected to the protection board interface 41.

The eleventh switch transistor M11 and the twelfth switch transistor M12 are transistors with a body diode. In addition, the fourth switch sub-circuit 452 further includes an eleventh transient voltage suppressor D11 connected to the eleventh switch transistor M11 in parallel, and a twelfth transient voltage suppressor D12 connected to the twelfth switch transistor M12 in parallel.

The third voltage sampling sub-circuit 453 includes a twelfth resistor R12 and a fifteenth capacitor C15. A first terminal of the twelfth resistor R12 is connected to the positive tab 31 of the cell 30, a second terminal of the twelfth resistor R12 is connected to a first terminal of the fifteenth capacitor C15 and a VDD pin of the first charge-discharge protection chip 42, and a second terminal of the fifteenth capacitor C15 is connected to the negative tab 32 of the cell 30.

The fourth voltage sampling sub-circuit 454 includes a fifteenth resistor R15 and a nineteenth capacitor C19. A first terminal of the fifteenth resistor R15 is connected to the positive tab 31 of the cell 30, a second terminal of the fifteenth resistor R15 is connected to a first terminal of the nineteenth capacitor C19 and a VDD pin of the second charge-discharge protection chip 43, and a second terminal of the nineteenth capacitor C19 is connected to a ground terminal GND.

The third current sampling sub-circuit 455 includes a thirteenth resistor R13 and a sixteenth capacitor C16. A first terminal of the thirteenth resistor R13 is connected to the negative tab 32 (that is, B−) of the cell 30, and a second terminal of the thirteenth resistor R13 is connected to a CS pin of the first charge-discharge protection chip 42. A first terminal of the sixteenth capacitor C16 is connected to the first terminal of the thirteenth resistor R13, and a second terminal of the sixteenth capacitor C16 is connected to the second terminal of the thirteenth resistor R13.

The fourth current sampling sub-circuit 456 includes a fourteenth resistor R14 and a seventeenth capacitor C17. A first terminal of the fourteenth resistor R14 is connected to the ground terminal GND, and a second terminal of the fourteenth resistor R14 is connected to a CS pin (that is, CS2) of the second charge-discharge protection chip 43. A first terminal of the seventeenth capacitor C17 is connected to the first terminal of the fourteenth resistor R14, and a second terminal of the seventeenth capacitor C17 is connected to the second terminal of the fourteenth resistor R14.

During actual use, when the cell 30 operate properly, the first charge-discharge protection chip 42 controls the ninth switch transistor M9 and the tenth switch transistor M10 to close, and the second charge-discharge protection chip 43 controls the eleventh switch transistor M11 and the twelfth switch transistor M12 to close.

During discharging of the cell 30, if the first charge-discharge protection chip 42 detects, through the third voltage sampling sub-circuit 453, that an output voltage of the cell 30 is less than an over-discharge protection voltage, the first charge-discharge protection chip 42 controls the ninth switch transistor M9 to cut off; and if the second charge-discharge protection chip 43 detects, through the fourth voltage sampling sub-circuit 454, that an output voltage of the cell 30 is less than an over-discharge protection voltage, the second charge-discharge protection chip 43 controls the eleventh switch transistor M11 to cut off.

During charging of the cell 30, if the first charge-discharge protection chip 42 detects, through the third voltage sampling sub-circuit 453, that an output voltage of the cell 30 increases to an over-charge protection voltage, the first charge-discharge protection chip 42 controls the tenth switch transistor M10 to cut off; and if the second charge-discharge protection chip 43 detects, through the fourth voltage sampling sub-circuit 454, that an output voltage of the cell 30 increases to an over-charge protection voltage, the second charge-discharge protection chip 43 controls the twelfth switch transistor M12 to cut off.

During discharging of the cell 30, if the first charge-discharge protection chip 42 detects, through the third current sampling sub-circuit 455, that a discharging current passing through the battery protection board 40 is greater than a preset discharging current, the first charge-discharge protection chip 42 also controls the ninth switch transistor M9 to cut off; and if the second charge-discharge protection chip 43 detects, through the fourth current sampling sub-circuit 456, that a discharging current passing through the battery protection board 40 is greater than a preset discharging current, the second charge-discharge protection chip 43 also controls the eleventh switch transistor M11 to cut off.

During charging of the cell 30, if the first charge-discharge protection chip 42 detects, through the third current sampling sub-circuit 455, that a charging current passing through the battery protection board 40 is greater than a preset charging current, the first charge-discharge protection chip 42 also controls the tenth switch transistor M10 to cut off; and if the second charge-discharge protection chip 43 detects, through the fourth current sampling sub-circuit 456, that a charging current passing though the battery protection board 40 is greater than a preset charging current, the second charge-discharge protection chip 43 also controls the twelfth switch transistor M12 to cut off.

In addition, the charge-discharge protection circuit further includes a sixteenth resistor R16, an eighteenth capacitor C18, a seventeenth resistor R17, a twentieth capacitor C20, an eighteenth resistor R18, a twenty-first capacitor C21, a twenty-second capacitor C22, and a third thermistor RT3. A first terminal of the sixteenth resistor R16 is connected to a VM pin of the first charge-discharge protection chip 42, a second terminal of the sixteenth resistor R16 is connected to a first terminal of the eighteenth capacitor C18, and a second terminal of the eighteenth capacitor C18 is connected to the third switch sub-circuit 451. The sixteenth resistor R16 limits a current to protect the first charge-discharge protection chip 42 from being damaged by a transient current. The eighteenth capacitor C18 prevents the switch transistor of the third switch sub-circuit 451 from being damaged by static electricity. A first terminal of the seventeenth resistor R17 is connected to a VM pin of the second charge-discharge protection chip 43, a second terminal of the seventeenth resistor R17 is connected to a first terminal of the twentieth capacitor C20, and a second terminal of the twentieth capacitor C20 is connected to the fourth switch sub-circuit 452. The seventeenth resistor R17 limits a current to protect the second charge-discharge protection chip 43 from being damaged by a transient current. The twentieth capacitor C20 is to prevent the switch transistor of the fourth switch sub-circuit 452 from being damaged by static electricity.

A first terminal of the eighteenth resistor R18 is connected to a CNT pin of the second charge-discharge protection chip 43 and a first terminal of the twenty-first capacitor C21, a second terminal of the eighteenth resistor R18 is connected to a JIG_SW pin of the protection board interface 41, and a second terminal of the twenty-first C21 is connected to the ground terminal GND. The eighteenth resistor R18 and the twenty-first capacitor C21 are filter networks that prevent false triggering. A first terminal of the twenty-second capacitor C22 is connected to the positive tab 31 of the cell 30, and a second terminal of the fourteenth capacitor C14 is connected to the negative tab 32 of the cell 30. A first terminal of the third thermistor RT3 is connected to the fourth switch sub-circuit 452, and a second terminal of the third thermistor RT3 is connected to a TH pin of the protection board interface 41.

Therefore, during charging or discharging of the cell 30, the charge-discharge protection circuit on the battery protection board 40 performs overvoltage protection, undervoltage protection, short-circuit protection, discharge overcurrent protection, charge overcurrent protection, and the like on the cell 30.

It should be noted that, for the cell 30 with two tabs disposed on a same side, the charge-discharge protection circuit is not limited to the circuit shown in FIG. 22. Any circuit capable of implementing charging and discharging protection for the cell 30 may be applied to this application.

Figure 23:
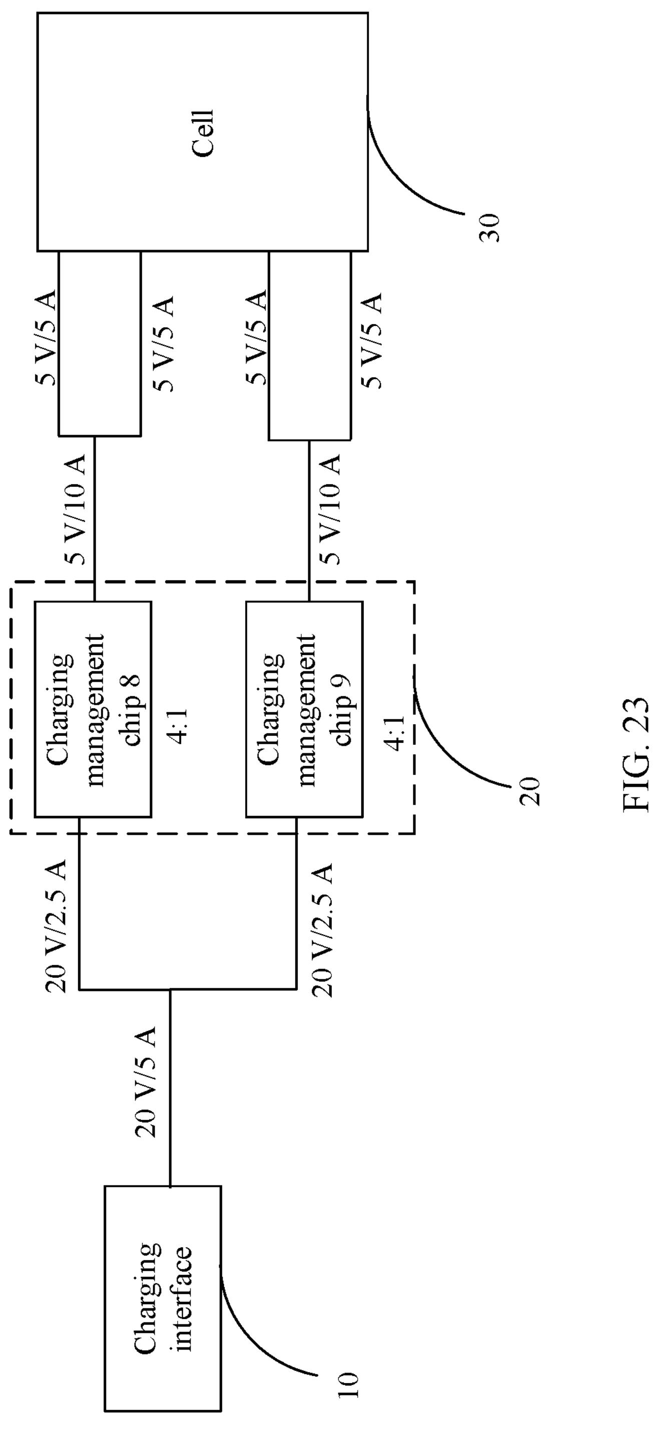
FIG. 23 is a schematic structural diagram of a fourth charging circuit according to an embodiment of this application.
Figure 24:
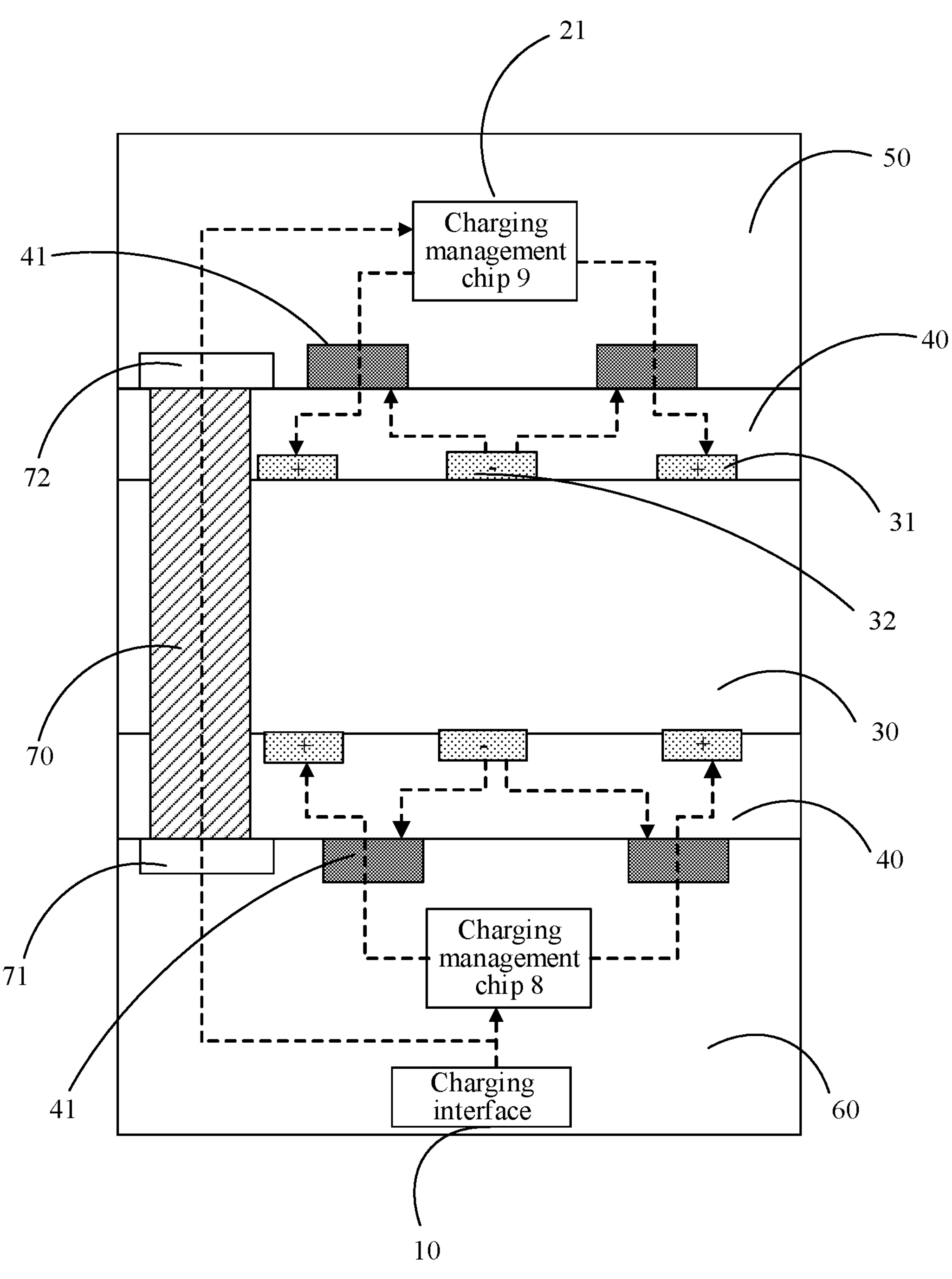
FIG. 24 is an architecture diagram of a terminal corresponding to the charging circuit shown in FIG. 23.

In a fourth implementation, as shown in FIG. 23 and FIG. 24, the charging circuit includes the charging interface 10, the charging management module 20, and the cell 30. The charging management module 20 includes two first charging management chips 21, for example, the two first charging management chips 21 are a charging management chip 8 and a charging management chip 9 respectively. The charging management chip 8 is connected to tab groups located on a same side of a cell body, and the charging management chip 9 is also connected to tab groups located on a same side of the cell body.

In this case, the cell 30 includes the cell body and six tabs, which are four positive tabs 31 and two negative tabs 32 respectively. Two of the positive tabs 31 and one of the negative tabs 32 are located on a first side of the cell body, and the remaining two positive tabs 31 and the remaining one negative tab 32 are located on a second side of the cell body. The negative tab 32 located on the first side is disposed between the two positive tabs 31 located on the first side, where the three tabs form two tab groups, and the two tab groups share the same negative tab 32. The negative tab 32 located on the second side is disposed between the two positive tabs 31 located on the second side, where the three tabs form two tab groups, and the two tab groups share the same negative tab 32. The first side and the second side are opposite sides of the cell body.

It can be understood that the cell 30 may alternatively include the cell body and six tabs, which are four negative tabs 32 and two positive tabs 31 respectively. Two of the negative tabs 32 and one of the positive tabs 31 are disposed on a first side of the cell body, where the positive tab 31 is located between the two negative tabs 32, the three tabs form two tab groups, and the two tab groups share the same positive tab 31. Correspondingly, two of the negative tabs 32 and one of the positive tabs 31 are also disposed on a second side of the cell body, where the positive tab 31 is located between the two negative tabs 32, the three tabs form two tab groups, and the two tab groups share the same positive tab 31.

As shown in FIG. 24, in an actual product, the four tab groups of the cell 30 are distributed on two sides of the cell body, and therefore a quantity of first charging management chips 21 in the charging management module 20 is also 2. In other words, the quantity of first charging management chips 21 in the charging management module 20 is equal to a quantity of sides on which the tab groups of the cell 30 are distributed. In addition, in a case that the four tab groups are distributed on both sides of the cell body, two battery protection boards 40 need to be disposed. One of the battery protection boards 40 is disposed between the micro board 60 and the cell 30, the other battery protection board 40 is disposed between the main board 50 and the cell 30, and the battery protection boards 40 each have two protection board interfaces.

The charging interface 10 and the charging management chip 8 are disposed on the micro board 60, an input terminal of the charging management chip 8 is connected to the charging interface 10, an output terminal of the charging management chip 8 is connected to the battery protection board 40) (a battery protection board located between the micro board 60) and the cell 30) through the two protection board interfaces 41, and the battery protection board 40) is then connected to two tab groups on a side of the cell 30 closer to the micro board 60. The charging interface 10 is also sequentially connected, through the wiring on the micro board 60, to the first circuit board connecting port 71, the connecting circuit board 70, the second circuit board connecting port 72, and the charging management chip 9 disposed on the main board 50, an output terminal of the charging management chip 9) is connected to the battery protection board 40) (a battery protection board located between the main board 50 and the cell 30) through the two protection board interfaces 41, and the battery protection board 40 is then connected to two tab groups on a side of the cell 30 closer to the main board 50.

In this case, step-down ratios of the charging management chip 8 and the charging management chip 9 are both 4:1, that is, N equals 4. The charging management chip 8 steps down a charging voltage $V_1$ inputted from the charging interface, and an output voltage $V_2$ resulting from the step-down is ¼ times the charging voltage $V_1$. The charging management chip 9 steps down a charging voltage $V_1$ inputted from the charging interface, and an output voltage $V_2$ resulting from the step-down is ¼ times the charging voltage $V_1$.

Therefore, after a charger is connected to the charging interface 10, the charger outputs a charging voltage of 20 V and a charging current of 5 A, and the charging current is divided on the micro board 60. One of the currents is inputted to the charging management chip 8, and the other current passes through the first circuit board connecting port 71, the connecting circuit board 70, and the second circuit board connecting port 72, and enters the charging management chip 9 disposed on the main board 50, so that a voltage and a current that are inputted to the charging management chip 8 are 20 V and 2.5 A respectively, and a voltage and a current that are inputted to the charging management chip 9 are also 20 V and 2.5 A respectively.

The charging management chip 8 converts the charging voltage of 20 V at a step-down ratio of 4:1, the converted output voltage is 5 V, and the converted output current is 10 A. Then, the output current outputted by the charging management chip 8 is divided on the micro board 60. One of the currents enters the battery protection board 40 between the micro board 60 and the cell 30 through one of the protection board interfaces 41 (for example, the protection board interface 41 on the lower left side in FIG. 24), and then flows into the positive tab 31 in one of the tab groups (for example, the tab group formed by the positive tab 31 on the lower left side in FIG. 24 and the shared negative tab 32). The other current enters the battery protection board 40 through the other protection board interface 41 (for example, the protection board interface 41 on the lower right side in FIG. 24), and then flows into the positive tab 31 in the other tab group (for example, the tab group formed by the positive tab 31 on the lower left side in FIG. 24 and the shared negative tab 32). The output current is divided to flow into the two tab groups, so that a specified voltage and a specified current that flow into each of the tab groups on the side of the cell 30 closer to the micro board 60 is 5 V and 5 A respectively.

Correspondingly, the charging management chip 9 converts the charging voltage of 20 V at a step-down ratio of 4:1, the converted output voltage is 5 V, and the converted output current is 10 A. Then, the charging management chip 9) divides the output current on the main board 50. One of the currents enters the battery protection board 40 between the main board 50 and the cell 30 through one of the protection board interfaces 41 (for example, the protection board interface 41 on the upper left side in FIG. 24), and then flows into the positive tab 31 in one of the tab groups (for example, the tab group formed by the positive tab 31 on the upper left side in FIG. 24 and the shared negative tab 32). The other current enters the battery protection board 40 between the main board 50 and the cell 30 through the other protection board interface 41 (for example, the protection board interface 41 on the upper right side in FIG. 24), and then flows into the positive tab 31 in the other tab group (for example, the tab group formed by the positive tab 31 on the upper right side in FIG. 24 and the shared negative tab 32). The output current is divided to flow into the two tab groups, so that a specified voltage and a specified current that flow into each of the tab groups on the side of the cell 30 closer to the main board 50 is 5 V and 5 A respectively.

In this case, a converted output voltage of the charging management module 20 is 5 V, and a total output current is a sum of the output currents of the charging management chip 8 and the charging management chip 9), that is, the total output current is 20 A. In addition, the four tab groups of the cell 30 are connected in parallel, the specified voltage inputted to each of the tab groups is 5 V, and the specified current inputted to each of the tab groups is 5 A. Therefore, a voltage inputted to the cell 30 is 5 V, a total current inputted to the cell 30 is 20 A, and charging power is 100 W.

For a specific composition and step-down process of the first charging management chip 21 and a specific structure of the charge-discharge protection circuit on the battery protection board 40, reference may be made to the first implementation, and details are not further described herein again to avoid repetition.

In conclusion, the charging circuit in this application includes the charging interface 10, the charging management module 20, and the cell 30, where the charging management module 20 is connected to the charging interface 10 and is configured to step down a charging voltage $V_1$ inputted from the charging interface 10 to obtain an output voltage $V_2$, and increase a charging current $A_1$ inputted from the charging interface 10 to obtain a total output current $A_2$, where the output voltage $V_2$ is 1/N times the charging voltage $V_1$, the total output current $A_2$ is N times the charging current $A_1$, and N is a positive integer greater than 2; and the charging management module is further connected to the cell 30 and is configured to input the output voltage $V_2$ and the total output current $A_2$ to the cell 30 to charge the cell 30; where a product of a maximum charging voltage and a maximum charging current that are inputted from the charging interface 10 is greater than 50 W.

Optionally, the cell 30 includes M tab groups, the tab groups each including a positive tab and a negative tab, where M is a positive integer greater than 1; and a specified voltage inputted to each of the tab groups is equal to the output voltage, and a specified current inputted to each of the tab groups is the total output current divided by M.

The foregoing four implementations all assume that the maximum charging voltage inputted from the charging interface 10 is 20 V and that the maximum charging current inputted from the charging interface 10 is 5 A. In practical, any implementations with the product of the maximum charging voltage and the maximum charging current that are inputted from the charging interface 10 set to be greater than 50 W are applicable.

Due to an influence of circuits in an existing charger, after the charger is connected to the charging interface 10, the charging current inputted by the charger to the charging interface 10 can currently reach a maximum of 5 A. Due to an influence of the cell 30) generating heat, a current allowed by an existing tab can reach a maximum of 10 A. Therefore, in the embodiments of this application, the charging voltage outputted by the charger can be increased to increase the charging power. However, due to an actual influence of the cell 30, a maximum specified voltage to be inputted to the cell 30 can be only 5 V at present. Therefore, in addition to increasing the charging voltage, the step-down ratio of the charging management module 20 needs to be changed, so that an output voltage resulting from converting the charging voltage by the charging management module 20 is 5 V.

Optionally, the maximum charging voltage inputted from the charging interface 10 is greater than 10 V, and the maximum charging current inputted from the charging interface 10 is 5 A, so that the charging power is greater than 50 W. A maximum specified voltage allowed to be inputted to each of the tab groups is 5 V, and a maximum specified current allowed to be inputted to each of the tab groups is 10 A. For example, the maximum charging voltage may be 15 V, 20 V, or 25 V.

When the maximum charging voltage inputted from the charging interface 10 is 15 V and the maximum charging current is 5 A, the step-down ratio of the charging management module 20 is 3:1, that is, N equals 3, so that the output voltage of the charging management module 20 is 5 V and the total output current is 15 A. If two tab groups are disposed on the cell 30, a specified voltage inputted by the charging management module 20 to each of the tab groups is 5 V, and a specified current inputted by the charging management module 20 to each of the tab groups is 7.5 A. In this case, charging power can reach 75 W.

When the maximum charging voltage inputted from the charging interface 10 is 20V and the maximum charging current is 5 A, the step-down ratio of the charging management module 20 is 4:1, that is, N equals 4, so that the output voltage of the charging management module 20 is 5 V and the total output current is 20 A. If two tab groups are disposed on the cell 30, a specified voltage inputted by the charging management module 20 to each of the tab groups is 5 V, and a specified current inputted by the charging management module 20 to each of the tab groups is 10 A. In this case, charging power can reach 100 W.

When the maximum charging voltage inputted from the charging interface 10 is 25 V and the maximum charging current is 5 A, the step-down ratio of the charging management module 20 is 5:1, meaning N equals 5, so that the output voltage of the charging management module 20 is 5 V and the total output current is 25 A. If four tab groups are disposed on the cell 30, a specified voltage inputted by the charging management module 20 to each of the tab groups is 5 V, and a specified current inputted by the charging management module 20 to each of the tab groups is 6.25 A. In this case, charging power can reach 125 W.

It should be noted that, with improvement of process, when the charging current inputted by the charger to the charging interface 10 can reach more than 5 A, such as 6 A and 7 A, and the maximum specified current allowed to be inputted to the tab group is greater than 10 A, the charging current inputted by the charger to the charging interface 10 can be further increased, and the charging management module 20 with a step-down ratio greater than 2:1 in the embodiments of this application is used, to further increase the charging power. In addition, with the improvement of the cell 30, when the maximum specified voltage inputted to the cell 30 can be greater than 5 V, the charging voltage inputted by the charger to the charging interface 10 can be further increased, and the charging management module 20 with a step-down ratio greater than 2:1 in the embodiments of this application is used, to further increase the charging power.

When the charging voltage inputted from the charging interface 10 is $V_1$, the charging current inputted from the charging interface 10 is $A_1$, and a step-down ratio of the charging management module 20 is N:1, the output voltage $V_2$ resulting from the charging management module 20 stepping down the charging voltage $V_1$ inputted from the charging interface 10 is equal to $V_1/N$, and the total output current $A_2$ resulting from the charging management module 20 increasing the charging current $A_1$ inputted from the charging interface 10 is equal to $A_1 \times N$. In this case, if the cell 30 is set to have M tab groups, the charging management module divides the output current $A_2$ to flow into the M tab groups, so that a specified current flowing into each of the tab groups is $A_2/M = A_1 \times N/M$.

If the maximum charging current inputted from the charging interface 10 is 5 A, that is, a maximum value of $A_1$ is 5 A, and the maximum specified current allowed to be inputted to each tab group of the cell 30 is 10 A, $A_1 \times N/M$ needs to be less than or equal to 10 A. After formula conversion, it can be obtained that N is less than or equal to 2M. In other words, a step-down ratio N of the charging management module 20 and a quantity M of tab groups of the cell 30 are controlled to satisfy that N is less than or equal to 2M, so that a maximum specified current flowing into each tab group of the cell 30 can be controlled to be less than or equal to 10 A to reduce heat generated by the cell 30 during charging and improve the charging safety.

It should be noted that the cell 30 in the embodiments of this application is only one cell, that is, only one cell 30 is disposed in a terminal device, which can reduce a space occupied by the battery and achieve a charging power of greater than 50 W.

In addition, the cell 30 includes a cell body and M tab groups, and the tab groups are all located on a same side of the cell body. Optionally, M equals 2. In this case, the cell includes three tabs, the three tabs form two tab groups, and the two tab groups share one positive tab or one negative tab. For example, as shown in FIG. 2 and FIG. 12, the cell 30) includes three tabs, the three tabs form two tab groups, the two tab groups share one negative tab, and the two tab groups are located on a side of the cell 30 facing toward the main board 50.

Alternatively, the cell 30 includes a cell body and M tab groups, some of the M tab groups are located on a first side of the cell body, the rest of the M tab groups are located on a second side of the cell body, and the first side and the second side are opposite sides of the cell body; and the first side and the second side of the cell body both include at least one tab group. For example, as shown in FIG. 18, the cell 30 includes two tab groups, and the first side and the second side of the cell body both include one tab; and as shown in FIG. 24, the cell 30) includes three tab groups, the first side and the second side of the cell body both include two tab groups, the two tab groups located on the first side share one negative tab, and the two tab groups located on the second side share one negative tab.

Therefore, a quantity of tab groups of the cell 30 is not limited to 2, but may be 3, 4, and so on, that is, M is not limited to 2, and M is a positive integer greater than 1.

In the embodiments of this application, the charging management module 20 may include the first charging management chip 21 with a step-down ratio of 4:1. As shown in FIG. 2. FIG. 18, and FIG. 24, the output voltage resulting from stepping down the charging voltage by the first charging management chip 21 is 1/N times the charging voltage, and a quantity of first charging management chips 21 in the charging management module 20 is equal to a quantity of sides on which the tab groups of the cell 30 are distributed. Alternatively, the charging management module 20 in the embodiments of this application may include two second charging management chips 22 connected in series, and a step-down ratio of the second charging management chip 22 is 2:1, so that a step-down ratio of the charging management module 20 is 4:1 by using the two second charging management chips 22 connected in series.

An embodiment of this application further provides a terminal device. As shown in FIG. 2. FIG. 12, FIG. 18, and FIG. 24, the terminal device includes a main board 50, a micro board 60, a connecting circuit board 70, a battery protection board 40, and the foregoing charging circuit; where a charging interface 10 is located on the micro board 60, one end of the connecting circuit board 70 is connected to the micro board 60, the other end of the connecting circuit board 70 is connected to the main board 50, at least part of the charging management chips in a charging management module 20 are located on the main board 50, and the charging management module 20 is connected to tab groups of a cell 30 via the battery protection board 40.

As shown in FIG. 2, the charging management module 20 includes one first charging management chip 21, namely a charging management chip 1, where the charging management chip 1 is located on the main board 50. As shown in FIG. 12, the charging management module 20 includes four second charging management chips 22, which are a charging management chip 2, a charging management chip 3, a charging management chip 4, and a charging management chip 5 respectively, where the charging management chip 2 and the charging management chip 4 are located on the micro board 60, and the charging management chip 3 and the charging management chip 5 are located on the main board 50. As shown in FIG. 18, the charging management module 20 includes two first charging management chips 21, namely a charging management chip 6 and a charging management chip 7, where the charging management chip 6 is located on the micro board 60, and the charging management chip 7 is located on the main board 50. As shown in FIG. 24, the charging management module 20 includes two first charging management chips 21, namely a charging management chip 8 and a charging management chip 9, where the charging management chip 8 is located on the micro board 60, and the charging management chip 9 is located on the main board 50.

In addition, for the connecting circuit board 70 in the terminal device, the connecting circuit board 70 may be disposed at a position close to the positive tab 31 to reduce a length of wiring between the charging interface 10 and the positive tab 31, thereby reducing wiring impedance to further reduce the heat generated during charging.

In the embodiments of this application, charging power inputted from the charging interface is increased, so that a product of the maximum charging voltage and the maximum charging current that are inputted from the charging interface is greater than 50 W, that is, maximum charging power can be greater than 50 W, thereby increasing the charging power and shortening charging time. In addition, through a step-down function of the charging management module, the output voltage inputted to the cell can meet a charging requirement of the cell.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a special-purpose computer, an embedded processor, or a processing unit of another programmable data processing device to generate a machine, so that the instructions executed by the computer or the processing unit of the another programmable data processing device generate an apparatus for implementing a specific function in one or more processes in the flowcharts and/or in one or more blocks in the block diagrams.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A charging circuit, comprising:

a charging interface;

a charging management circuit; and a cell;

wherein the charging management circuit is connected to the charging interface and is configured to step down a charging voltage inputted from the charging interface to obtain an output voltage, and increase a charging current inputted from the charging interface to obtain a total output current, wherein the output voltage is 1/N times the charging voltage, the total output current is N times the charging current, and N is a positive integer greater than 2;

wherein the charging management circuit is further connected to the cell and is configured to input the output voltage and the total output current to the cell to charge the cell;

wherein a product of a maximum charging voltage and a maximum charging current that are inputted from the charging interface is greater than 50 W;

wherein the cell comprises M tab groups, wherein each tab group of the M tab groups comprises a positive tab and a negative tab, and wherein M is a positive integer greater than 1;

wherein a specified voltage inputted to each tab group of the M tab groups is equal to the output voltage, and a specified current inputted to each tab group of the M tab groups is the total output current divided by M;

wherein the cell further comprises a cell body, a first set of tab groups of the M tab groups is located on a first side of the cell body, a second set of tab groups of the M tab groups is located on a second side of the cell body, and the first side and the second side are opposite sides of the cell body; and wherein the first side and the second side of the cell body both comprise at least one tab group.

2. The charging circuit according to claim 1, wherein the maximum charging voltage is greater than 10 V, the maximum charging current is 5 A, a maximum specified voltage allowed to be inputted to each tab group of the M tab groups is 5 V, and a maximum specified current allowed to be inputted to each tab group of the M tab groups is 10 A.

3. The charging circuit according to claim 1, wherein the first side and the second side of the cell body both comprise one tab group.

4. The charging circuit according to claim 1, wherein the first side and the second side of the cell body both comprise two tab groups, with the two tab groups located on the first side sharing one positive tab or one negative tab and the two tab groups located on the second side sharing one positive tab or one negative tab.

5. The charging circuit according to claim 1, wherein the charging management circuit comprises a first charging management chip, and the first charging management chip is connected to at least one tab group of the M tab groups.

6. The charging circuit according to claim 5, wherein the charging management circuit comprises a plurality of first charging management chips, wherein a quantity of first charging management chips in the plurality of first charging management chips is equal to a quantity of sides on which the tab groups of the cell are distributed.

7. The charging circuit according to claim 5, wherein the first charging management chip comprises a first control circuit, a second control circuit, and N first storage circuits;

wherein the first control circuit is connected to a first control signal end and the N first storage circuits and is configured to be closed under an action of a first control signal inputted from the first control signal end to connect the N first storage circuits in series;

wherein the second control circuit is connected to a second control signal end and the N first storage circuits and is configured to be closed under an action of a second control signal inputted from the second control signal end to connect the N first storage circuits in parallel; and wherein the first control signal and the second control signal are phase inversion signals.

8. The charging circuit according to claim 7, wherein the first control circuit comprises N first switch components, and all the first switch components except a $1^{st}$ first switch component are connected between two adjacent first storage circuits, wherein an input terminal of the $1^{st}$ first switch component is connected to the charging interface, and an output terminal of the $1^{st}$ first switch component is connected to a first terminal of a $1^{st}$ first storage circuit;

wherein the second control circuit comprises N−1 switch units, and the switch units each comprise two second switch components, wherein an input terminal of a $1^{st}$ second switch component is connected to a first terminal of the first storage circuit, an output terminal of the $1^{st}$ second switch component is connected to an output terminal of the first charging management chip, an input terminal of a $2^{nd}$ second switch component is connected to a second terminal of the first storage circuit, and an output terminal of the $2^{nd}$ second switch component is connected to a ground terminal;

wherein a first terminal of an $N^{th}$ first storage circuit of the N first storage circuits is connected to the output terminal of the first charging management chip, and a second terminal of the $N^{th}$ first storage circuit of the N first storage circuits is connected to the ground terminal; and wherein the N first storage circuits each comprise a first storage capacitor, and the first switch components and the second switch components are switch transistors with a body diode.

9. The charging circuit according to claim 1, wherein the charging management circuit comprises a first charging management unit comprising two second charging management chips connected in series, and the two second charging management chips connected in series are respectively a first management chip and a second management chip, wherein N equals 4;

wherein an input terminal of the first management chip is connected to the charging interface, an output terminal of the first management chip is connected to an input terminal of the second management chip, and an output terminal of the second management chip is connected to the first set of tab groups of the M tab groups that is located on the first side of the cell body; and wherein a transition voltage resulting from stepping down the charging voltage by the first management chip is half the charging voltage, and the output voltage resulting from stepping down the transition voltage by the second management chip is half the transition voltage.

10. The charging circuit according to claim 9, wherein the charging management circuit further comprises a second charging management unit connected in parallel with the first charging management unit, and the output terminal of the second management chip of the second charging management unit is connected to the second set of tab groups of the M tab groups that is located on the second side of the cell body.

11. The charging circuit according to claim 9, wherein each of the two second charging management chips comprises a third control circuit, a fourth control circuit, and two second storage circuits;

wherein the third control circuit is connected to a third control signal end and the two second storage circuits and is configured to be closed under an action of a third control signal inputted from the third control signal end to connect the two second storage circuits in series;

wherein the fourth control circuit is connected to a fourth control signal end and the two second storage circuits and is configured to be closed under an action of a fourth control signal inputted from the fourth control signal end to connect the two second storage circuits in parallel; and wherein the third control signal and the fourth control signal are phase inversion signals.

12. The charging circuit according to claim 11, wherein the third control circuit comprises two third switch components, an input terminal of a $1^{st}$ third switch component is connected to the charging interface, an output terminal of the $1^{st}$ third switch component is connected to a first terminal of a $1^{st}$ second storage circuit, an input terminal of a $2^{nd}$ third switch component is connected to a second terminal of the $1^{st}$ second storage circuit, an output terminal of the $2^{nd}$ third switch component is connected to a first terminal of a $2^{nd}$ second storage circuit and an output terminal of the second charging management chip, and a second terminal of the $2^{nd}$ second storage circuit is connected to a ground terminal;

wherein the fourth control circuit comprises two fourth switch components, an input terminal of a $1^{st}$ fourth switch component is connected to the first terminal of the $1^{st}$ second storage circuit, an output terminal of the $1^{st}$ fourth switch component is connected to the output terminal of the second charging management chip, an input terminal of a $2^{nd}$ fourth switch component is connected to the second terminal of the $1^{st}$ second storage circuit, and an output terminal of the $2^{nd}$ fourth switch component is connected to the ground terminal; and wherein the second storage circuits each comprise a second storage capacitor, and the third switch components and the fourth switch components are switch transistors with a body diode.

13. The charging circuit according to claim 2, wherein the maximum charging voltage is 20 V, wherein N equals 4, and wherein M is 2 or 4.

14. A terminal device, comprising:

a main board;

a micro board;

a connecting circuit board;

a battery protection board; and a charging circuit comprising a charging interface, a charging management circuit, and a cell;

wherein the charging management circuit is connected to the charging interface and is configured to step down a charging voltage inputted from the charging interface to obtain an output voltage, and increase a charging current inputted from the charging interface to obtain a total output current, wherein the output voltage is 1/N times the charging voltage, the total output current is N times the charging current, and N is a positive integer greater than 2;

wherein the charging management circuit is further connected to the cell and is configured to input the output voltage and the total output current to the cell to charge the cell;

wherein a product of a maximum charging voltage and a maximum charging current that are inputted from the charging interface is greater than 50 W;

wherein the charging interface is located on the micro board, one end of the connecting circuit board is connected to the micro board, the other end of the connecting circuit board is connected to the main board, at least one charging management chip in the charging management circuit is located on the main board, and the charging management circuit is connected to tab groups of the cell via the battery protection board;

wherein the cell comprises M tab groups, wherein each tab group of the M tab groups comprises a positive tab and a negative tab, and wherein M is a positive integer greater than 1;

wherein a specified voltage inputted to each tab group of the M tab groups is equal to the output voltage, and a specified current inputted to each tab group of the M tab groups is the total output current divided by M;

wherein the cell further comprises a cell body, a first set of tab groups of the M tab groups is located on a first side of the cell body, a second set of tab groups of the M tab groups is located on a second side of the cell body, and the first side and the second side are opposite sides of the cell body; and wherein the first side and the second side of the cell body both comprise at least one tab group.

15. The terminal device according to claim 14, wherein the maximum charging voltage is greater than 10 V, the maximum charging current is 5 A, a maximum specified voltage allowed to be inputted to each tab group of the M tab groups is 5 V, and a maximum specified current allowed to be inputted to each tab group of the M tab groups is 10 A.

16. The terminal device according to claim 15, wherein the maximum charging voltage is 20 V, wherein N equals 4, and wherein M is 2 or 4.

17. The terminal device according to claim 14, wherein the charging management circuit comprises a first charging management chip, and the first charging management chip is connected to at least one tab group of the M tab groups.

18. The terminal device according to claim 17, wherein the charging management circuit comprises a plurality of first charging management chips, wherein a quantity of first charging management chips in the plurality of first charging management chips is equal to a quantity of sides on which the tab groups of the cell are distributed.

19. The terminal device according to claim 17, wherein the first charging management chip comprises a first control circuit, a second control circuit, and N first storage circuits;

wherein the first control circuit is connected to a first control signal end and the N first storage circuits and is configured to be closed under an action of a first control signal inputted from the first control signal end to connect the N first storage circuits in series;

wherein the second control circuit is connected to a second control signal end and the N first storage circuits and is configured to be closed under an action of a second control signal inputted from the second control signal end to connect the N first storage circuits in parallel; and wherein the first control signal and the second control signal are phase inversion signals.

20. The terminal device according to claim 19, wherein the first control circuit comprises N first switch components, and all the first switch components except a $1^{st}$ first switch component are connected between two adjacent first storage circuits, wherein an input terminal of the $1^{st}$ first switch component is connected to the charging interface, and an output terminal of the $1^{st}$ first switch component is connected to a first terminal of a $1^{st}$ first storage circuit;

wherein the second control circuit comprises N−1 switch units, and the switch units each comprise two second switch components, wherein an input terminal of a $1^{st}$ second switch component is connected to a first terminal of the first storage circuit, an output terminal of the $1^{st}$ second switch component is connected to an output terminal of the first charging management chip, an input terminal of a $2^{nd}$ second switch component is connected to a second terminal of the first storage circuit, and an output terminal of the $2^{nd}$ second switch component is connected to a ground terminal;

wherein a first terminal of an $N^{th}$ first storage circuit of the N first storage circuits is connected to the output terminal of the first charging management chip, and a second terminal of the $N^{th}$ first storage circuit of the N first storage circuits is connected to the ground terminal; and wherein the N first storage circuits each comprise a first storage capacitor, and the first switch components and the second switch components are switch transistors with a body diode.

* * * * *